United States Patent [19]
Nakazato et al.

[11] Patent Number: 4,586,089
[45] Date of Patent: Apr. 29, 1986

[54] IMAGE PROCESSOR

[75] Inventors: Katsuo Nakazato, Tokyo; Kunio Sannomiya, Kanagawa; Hidehiko Kawakami, Tokyo; Hiroyoshi Tsuchiya; Hiroyoshi Otsuka, both of Kanagawa; Hideo Uchida, Tokyo, all of Japan

[73] Assignees: Matsushita Electric Industrial Co., Ltd.; Matsushita Graphic Communication Systems, Inc., both of Tokyo, Japan

[21] Appl. No.: 523,952

[22] Filed: Aug. 17, 1983

[30] Foreign Application Priority Data

Aug. 18, 1982 [JP] Japan .................. 57-143940
Oct. 22, 1982 [JP] Japan .................. 57-186439
Oct. 22, 1982 [JP] Japan .................. 57-186437
Oct. 22, 1982 [JP] Japan .................. 57-186438
Oct. 26, 1982 [JP] Japan .................. 57-188395

[51] Int. Cl.$^4$ ............................. H04N 1/40
[52] U.S. Cl. ........................ 358/280; 358/282; 358/284; 382/54
[58] Field of Search ............ 358/280, 282, 283, 284; 382/39, 50, 54

[56] References Cited

U.S. PATENT DOCUMENTS 4,491,961  1/1985  Sutton et al. ................. 382/50
4,491,964  1/1985  Sanner .......................... 382/50
4,503,467  3/1985  Ida et al. ..................... 358/50

Primary Examiner—Edward L. Coles, Sr.
Attorney, Agent, or Firm—Burgess, Ryan & Wayne

[57] ABSTRACT

An image processor for reproducing a continuous tone image such as a photograph in a black-and-white binary dot image (halftone image) has a linear correction section for converting a sampled digital image signal in a predetermined manner controlled by black and white densities of an original, thereby performing linear conversion between the continuous tone image and the halftone image. The image processor also has another correction section for performing profile emphasis to obtain a clear halftone image.

18 Claims, 30 Drawing Figures

FIG. 12
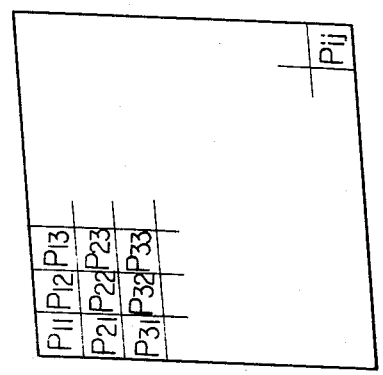
(C)
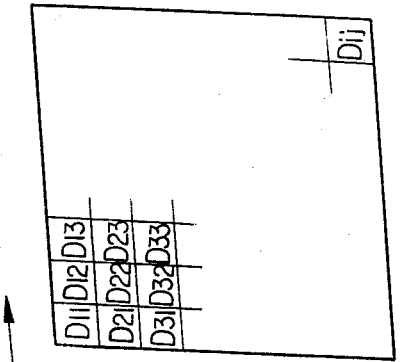
(B)
(A)

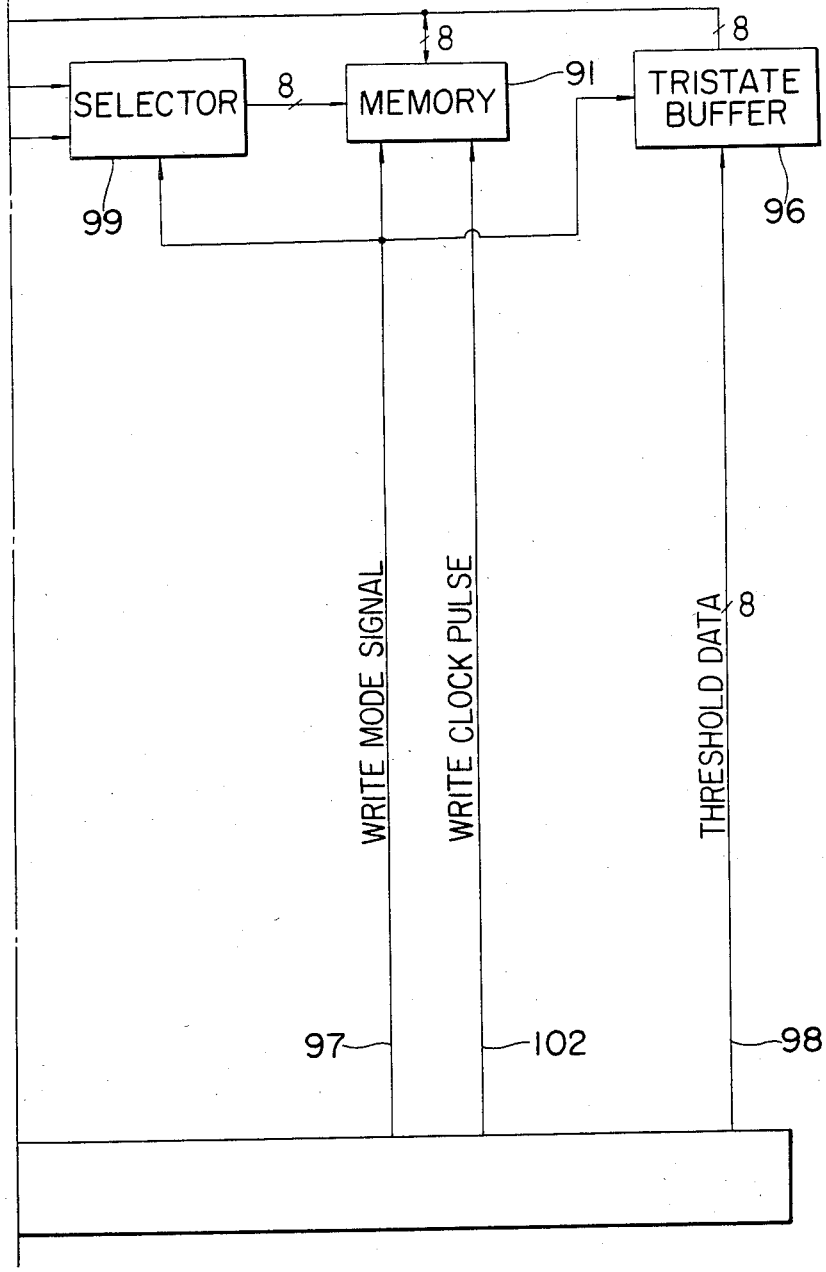

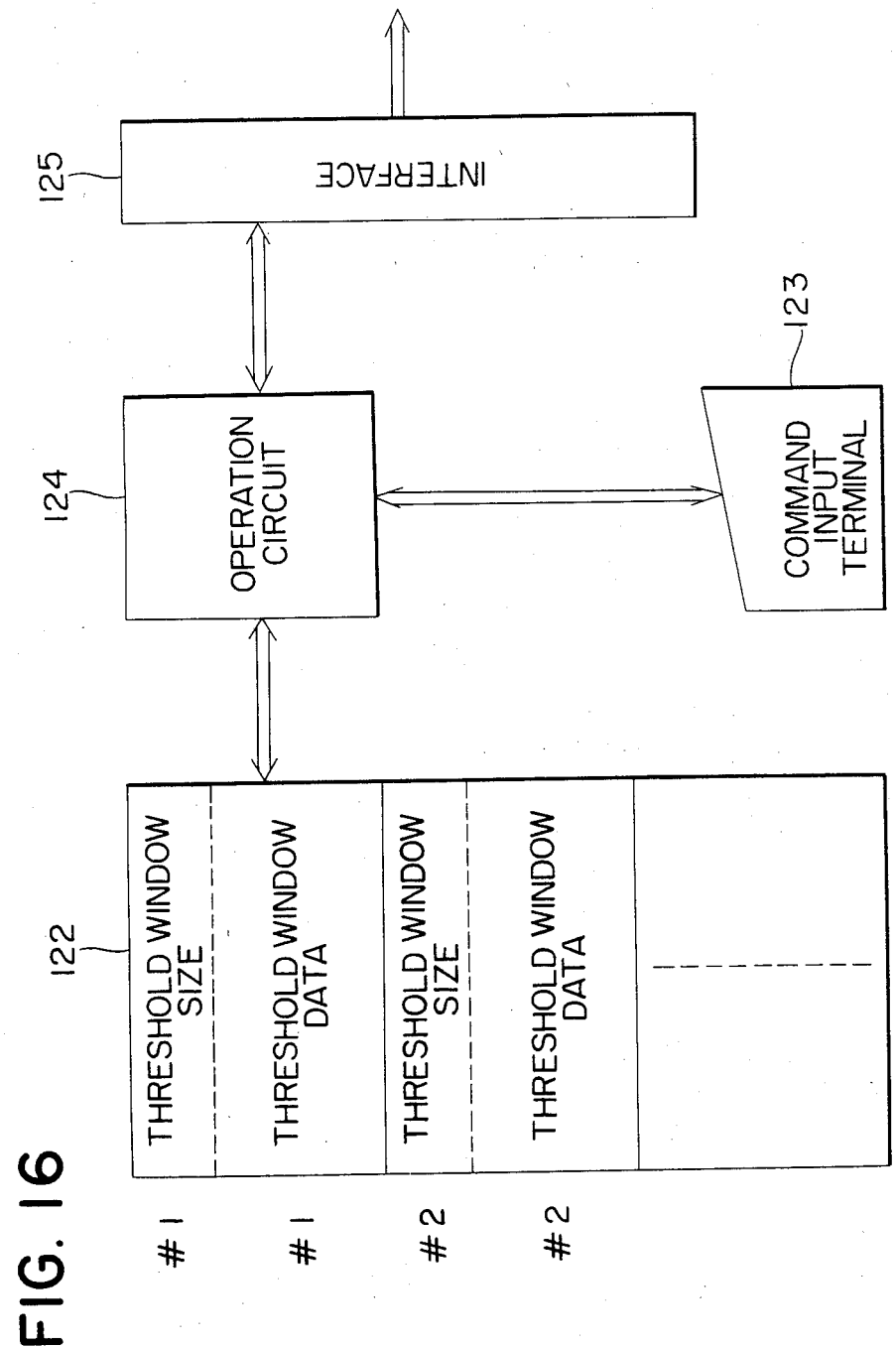

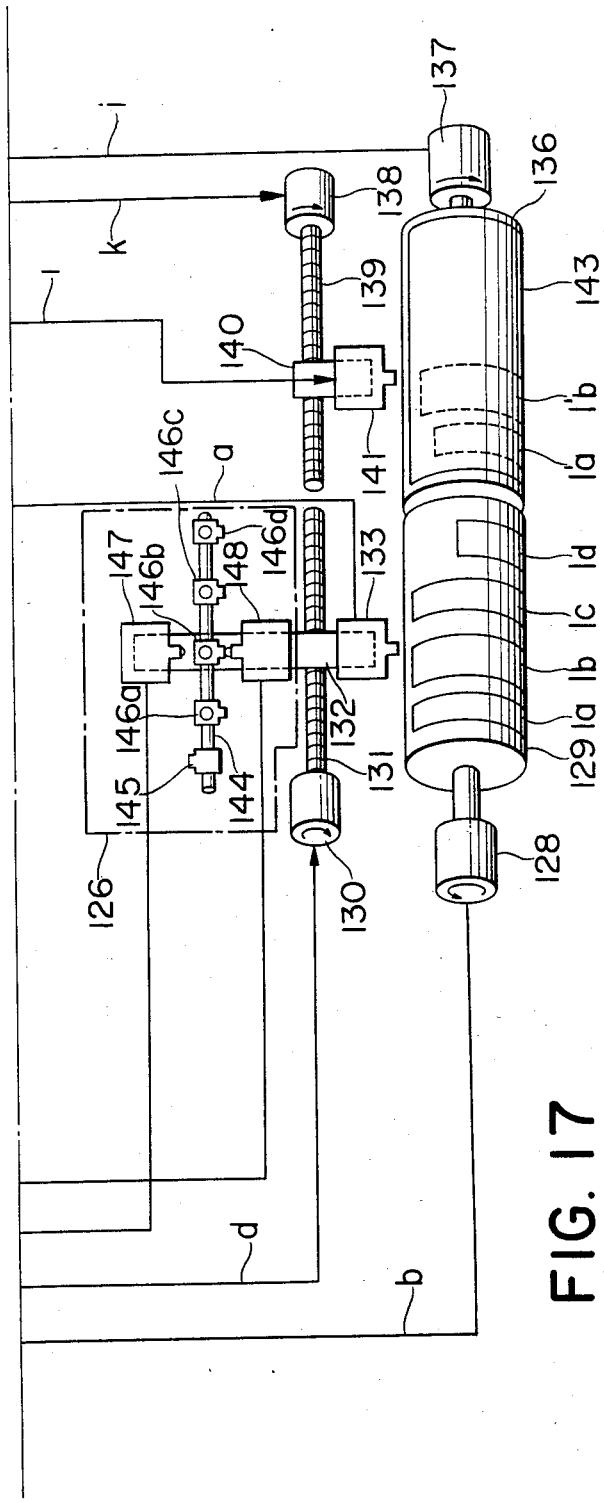

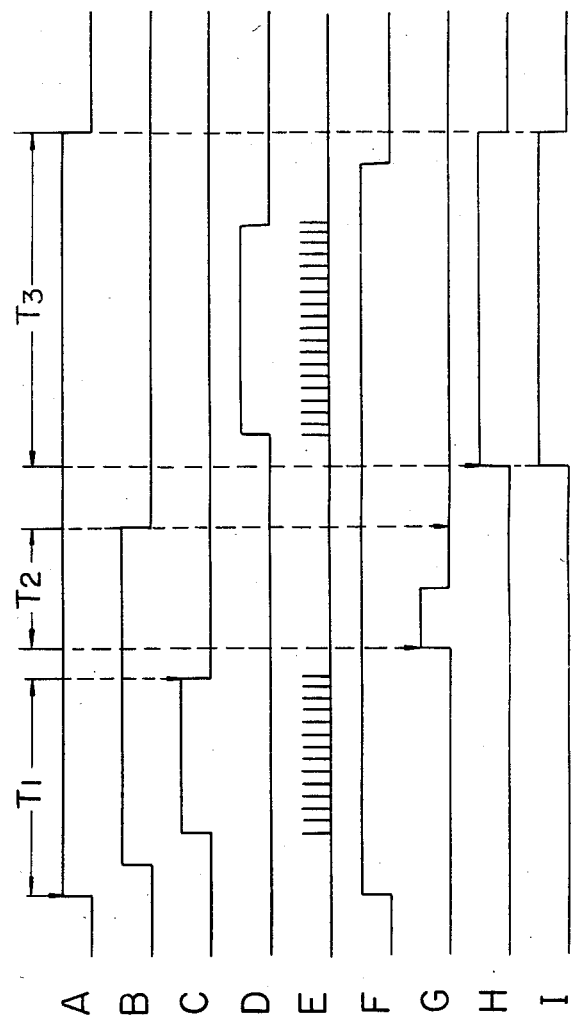

IMAGE PROCESSOR

BACKGROUND OF THE INVENTION

The present invention relates to an image processor used for reproducing a continuous tone image such as a photograph as black-and-white binary dot image (i.e. halftone image).

In a conventional image scanner/recorder, a tone scale (i.e., gray scale) of a read out digital image signal is roughly corrected by an operator's skill during signal processing so as to assure tone quality of the output image. No attempt has, however, been made to automatically obtain linear tone scale conversion.

Along with recent developments in electrophotographic and printing techniques, even in the conventional image scanner/recorder, there arises a strong demand for highly precise tone reproduction. Therefore, conventional trial-and-error methods must be greatly improved. The most significant improvement is to realize a system for assuring linear tone scale conversion between an input image and the output image. More particularly, in the linear tone scale conversion system, a precise tone change in an input image must be controlled in accordance with a tone correction curve without trial-and-error. Then, in the scanner/recorder having the linear tone scale convention, an operator can easily control the tone quality of the output image without sensous skill.

SUMMARY OF THE INVENTION

It is, therefore, an object of the present invention to provide an image processor which eliminates a conventional drawback caused by tone conversion of an original image (continuous tone image) to a recorded image (halftone image), which drawback is inherent to the conventional apparatuses described above.

In order to achieve the above object of the present invention, there is provided an image processor comprising: image reading means for photoelectrically scanning an original to obtain image data as an input analog image signal; sampling means for A/D-converting the input analog image signal to obtain a sampled image signal; correcting means for correcting the sampled image signal from said sampling means; and processed image data generating means for generating a binary image signal corresponding to a black-and-white binary dot image in accordance with an output from said correcting means, wherein the sampled digital image signal obtained by A/D conversion in said sampling means is converted by said correcting means in a predetermined manner controlled in accordance with a white density and a black density of the original so as to obtain a linear relationship between the original and the recording image.

The correcting means of the image processor of the present invention has: memory means having a plurality of line memories which have individual line numbers and which stores in a predetermined order of line number order the sampled digital image signals supplied from said sampling means; readout means for reading out the sampled digital image signals from said line memory in the predetermined order of line number order; signal output means for reading out the sampled digital image signals in synchronism with said readout means; delaying means for delaying by predetermined clock periods a plurality of multi-level digital image signals obtained by said readout means and said signal output means; parameter preset means for presetting a predetermined edge emphasis parameter; calculating means for performing edge emphasis calculation in accordance with the plurality of sampled digital image signals delayed by said delaying means and the edge emphasis parameter preset by said parameter preset means; and calculating result output means for producing a result of calculation performed by said calculating means.

The processed image data generating means of the image processor of the present invention has: a memory for storing threshold data to obtain a binary dot recording signal from a sampled digital image signal; an address counter for writing the threshold data at a predetermined location of said memory; a register for storing data indicating a size of a scanning window in a main scanning direction and a subscanning direction of the threshold data; a selector for switching between a write address and a read address of said memory; a pixel clock pulse counter for determining upper/lower bits of the read address of said memory; a first comparator for comparing a content of said pixel clock pulse counter and data indicating the size of the scanning window in the main scan direction of the threshold data; a main scanning synchronous pulse counter for determining upper/lower bits of the read address of said memory; a second comparator for comparing a content of said main scanning synchronous pulse counter and the data indicating the size of the scanning window in the subscan direction of the threshold data; and a third comparator for comparing the threshold data read out from said memory and the sampled digital image data.

The image reading means of the image processor of the present invention has means for designating a plurality of regions of the original scanning area and means for presetting various control items corresponding to the regions, the various control items being used to control said correcting means and said processed image data generating means.

The image reading means and the processed image data generating means of the image processor of the present invention comprise: a single light source; beam splitting means for splitting a light beam emitted from said light source into a first light beam for image scanner/reading and a second light beam for image recording; a rotating polygon mirror for reflecting the first and second light beams from different surfaces thereof; detecting means for detecting a rotating state of said rotating polygon mirror; the first processing means for processing a reading image signal obtained by emitting the first light beam onto the original; the second processing means for recording an output image on a recording paper using the second light beam; and controlling means for synchronizing processing of said the first processing means with the processing of the second processing means in accordance with a detection result from said detecting means.

The processed image data generating means of the image processor of the present invention further comprises: first controlling means for individually controlling paper exhaust operation, paper rewind operation and paper exhaust operation of a recording paper drive section; second controlling means for controlling a length of the recording paper and for generating control signals to control the paper feed, rewind and exhaust operations in accordance with a count operation thereof; and third controlling means for controlling cutting of the recording paper.

BRIEF DESCRIPTION OF THE DRAWINGS

FIGS. 12(A) to 12(C) are respectively representations for explaining the conversion of original data to binary data;

FIGS. 15 and 16 are respectively block diagrams showing the main part of a timing signal generator in the image processing means;

FIG. 24 is a timing chart of signals at the drive mechanism shown in FIG. 23.

DETAILED DESCRIPTION OF THE PREFERRED EMBODIMENTS

The preferred embodiments will be described in detail with reference to the accompanying drawings.

Figure 1:
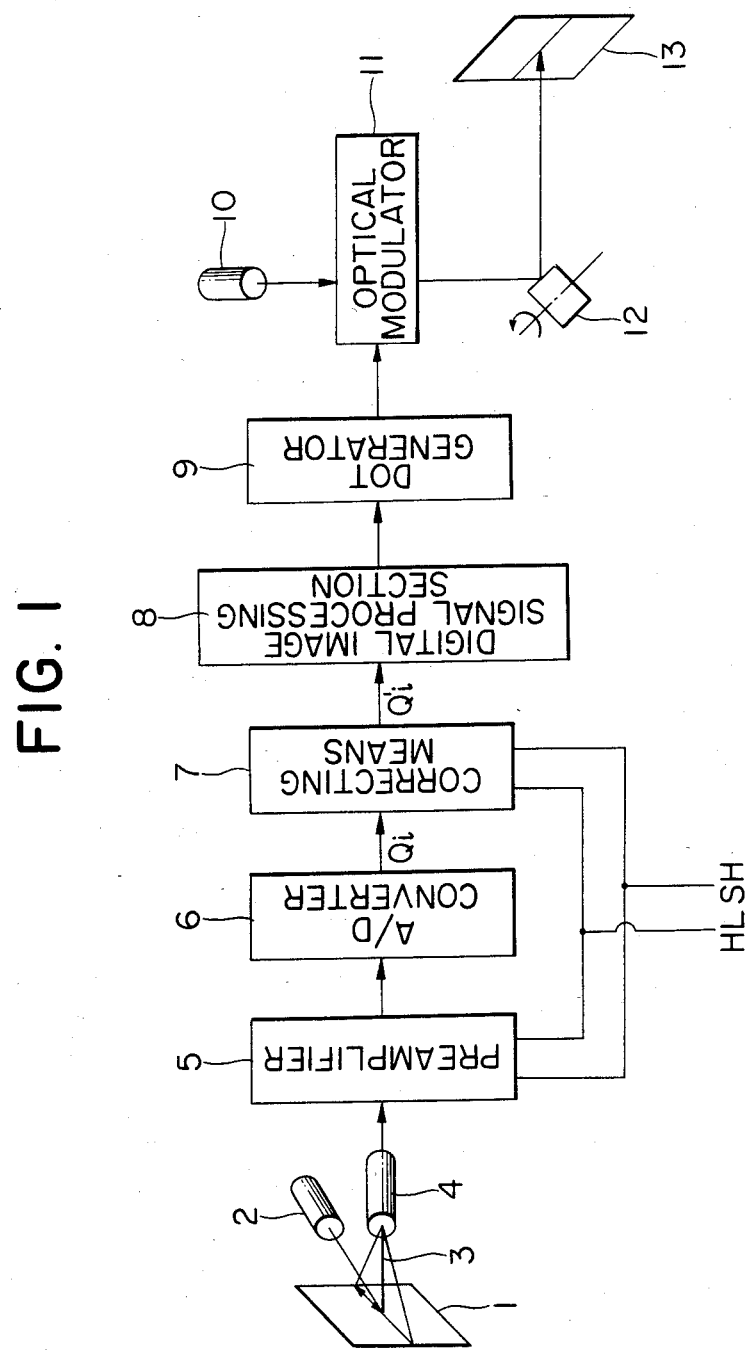
FIG. 1 is a schematic block diagram of an image processor according to an embodiment of the present invention.

FIG. 1 is a block diagram of an image processor according to an embodiment of the present invention. The image processor comprises: a light source 2 for scanning an original 1; a photoelectric transducer element 4 for transducing light 3 reflected by the original 1 in accordance with a density of the original 1 to an electric signal; a preamplifier 5 for amplifying the electric signal to a level suitable for an A/D converter 6 (to be described later) under the control of a white density HL and a black density SH of the original 1, the A/D converter 6 being provided to convert the input analog image signal from the preamplifier 5 to a sampled digital image signal as parallel-bit data; a linear correction section 7 for converting the sampled digital image signal for linear correction and for generating a corrected (converted) digital image signal; a digital image signal processing section 8 for performing digital image signal processing such as edge emphasis and tone correction of the corrected digital image signal; a dot generator 9 for generating white or black binary dot image signals in accordance with the density of each pixel of the original 1; an optical modulator 11 for modulating incident light from a recording light source 10 by the binary dot image signal; and a rotating mirror 12 for optically scanning light from the optical modulator 11. A recorded image is reproduced on recording paper 13 by the recording light scanning of the rotating mirror 12.

Figure 2:
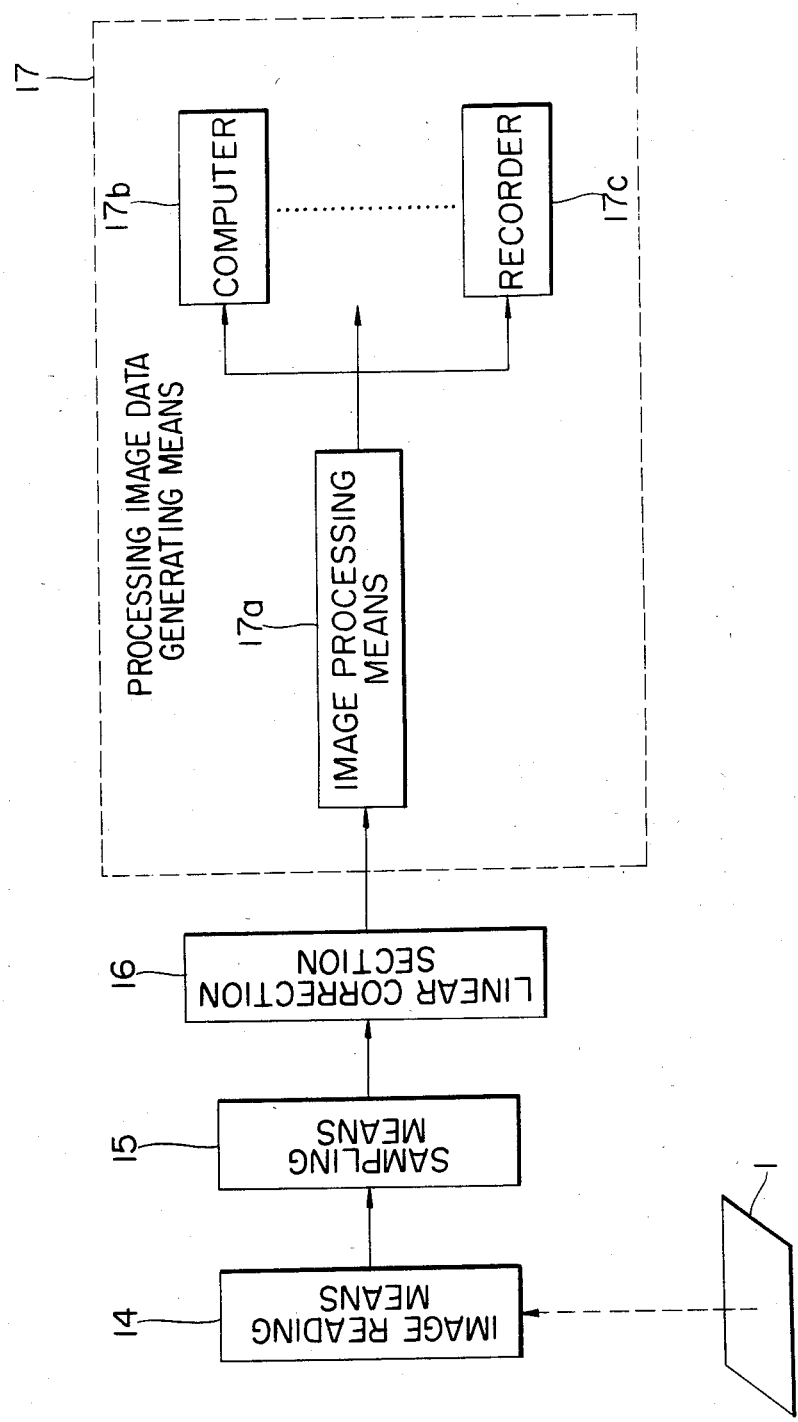
FIG. 2 is a block diagram showing the basic configuration of the image processor shown in FIG. 1.

In order to best understand the above configuration, the basic configuration of the image processor is illustrated in FIG. 2.

Referring to FIG. 2, reference numeral 14 denotes an image reading means for photoelectrically transducing image data of the original 1 to obtain an input analog image signal. The image reading means 14 corresponds to the light source 2 and the photoelectric transducer element 4. Reference numeral 15 denotes a sampling means for sampling the input analog image signal supplied from the image reading means 14 by A/D conversion and for producing a sampled digital image signal. The sampling means 15 corresponds to the preamplifier 5 (FIG. 1) and the A/D converter 6 (FIG. 1). Reference numeral 16 denotes a correcting means for correcting linearity of the sampled digital image signal supplied from the sampling means 15 and for producing a corrected digital image signal. The correcting means 16 corresponds to the linear correction section 7 (FIG. 1) and the digital image signal processing section 8 (FIG. 1). Reference numeral 17 denotes a processed image data generating means for generating white or black binary image data in accordance with the corrected digital image signal supplied from said correcting means 16. The processed image data generating means 17 may include a computer 17b, a recorder 17c or the like as needed. It is very easy to modify the image processor to control an interface unit coupling the computer 17b to peripheral units, and an image display unit or a data transmission control unit for transmitting image data to a remote area via a transmission line.

The processed image data generating means 17 corresponds to the dot generator 9, the recording light source 10, the optical modulator 11 and the rotating mirror 12 of FIG. 1.

Referring again to FIG. 1, the sampled digital image signal $Q_i$ from the A/D converter 6 can be expressed as follows:

$$\left. \begin{array}{l} Q_i = 0 \text{ for } D_i < HL \\ Q_i = \{Q_M/(10^{-HL} - 10^{-SH})\}(10^{-HL} - 10^{-D_i}) \\ \quad \text{ for } HL \leq D_i \leq SH \\ Q_i = Q_M \text{ for } D_i > SH \end{array} \right\} \quad (1)$$

where $D_i$ is the density of the original 1

HL is the white density of the original 1

$Q_M$ is the maximum number of bits of the A/D converter 6

SH is the black density of the original 1

In other words, the sampled digital image signal $Q_i$ is set to be 0 when the density $D_i$ of the original 1 is less than the white density HL. However, the sampled digital image signal $Q_i$ has a level corresponding to the maximum number $Q_M$ of bits of the A/D converter 6 when the density $D_i$ of the original 1 exceeds the black density HL. The sampled digital image signal $Q_i$ has a level proportional to a refractance when the density $D_i$ of the original 1 falls within the range between the white density HL and the black density SH.

Figure 3:
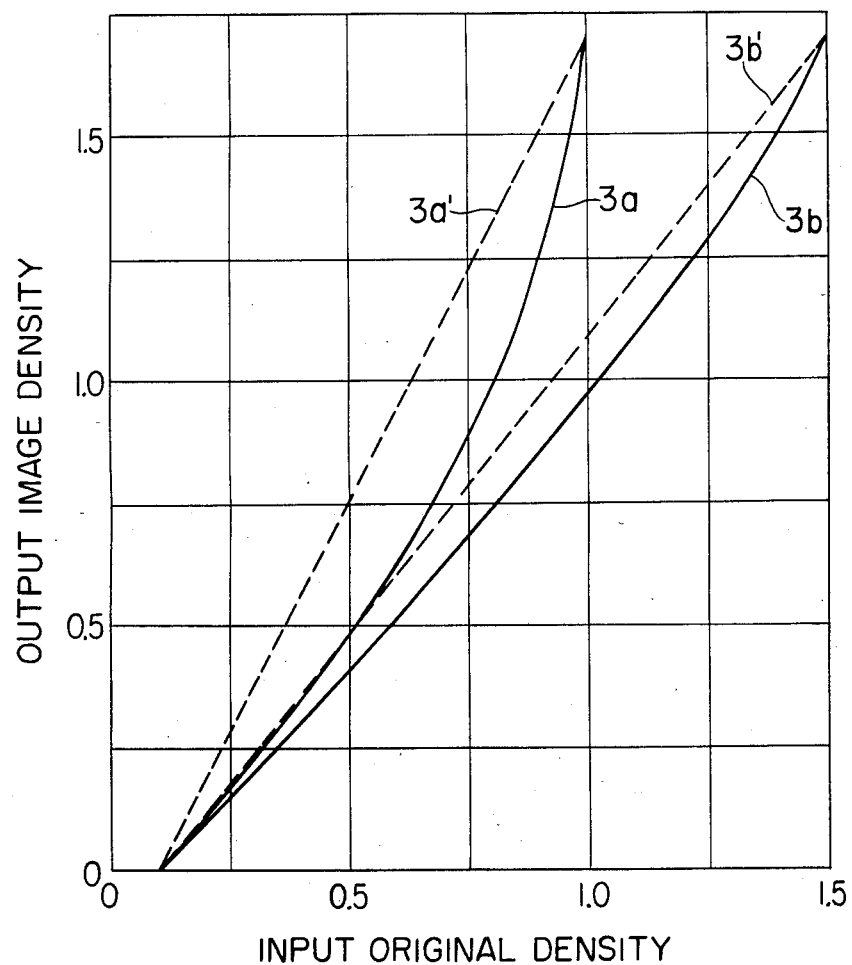
FIG. 3 is a graph showing the density characteristics of input and output images so as to explain the principle of the present invention.

The density $D_i$ of the original 1 vs. density of the recorded image is given in the following equation $$(1 - 10^{-D_O})/(1 - 10^{D_{OM}}) = (10^{-HL} - 10^{-D_i})/(10^{-HL} - 10^{-SH}) \quad (2)$$

where $D_O$ is the minimum density of the recorded (output) image $D_{OM}$ is the maximum density of the recorded image and is illustrated in the graph (FIG. 3). Referring to FIG. 3, a curve 3a corresponds to HL=0.1 and SH=1.0 if $D_{OM}$=1.7, and a curve 3b corresponds to HL=0.1 and SH=1.5 under the same condition. When the curves 3a and 3b are converted to match straight lines 3a′ and 3b′, respectively, the continuous tone image can be successfully obtained to a halftone image in accordance with linear tone scale conversion. In order to achieve the above correction, the sampled digital image signal $Q_i$ must be converted to a corrected digital image signal $Q_i'$ obtained in accordance with equation (2) below:

$$Q'_i = \frac{Q_{iM}}{1 - 10^{-D_{OM}}} \left[ 1 - 10^{\frac{D_{OM}}{SH-HL} \cdot \{log(10^{-HL} - \frac{10^{-HL} - 10^{SH}}{Q_{iM}} \cdot Q_i) + HL\}} \right] \quad (3)$$

where $Q_{iM}$ is the maximum value of the sampled digital image signal.

Figure 4:
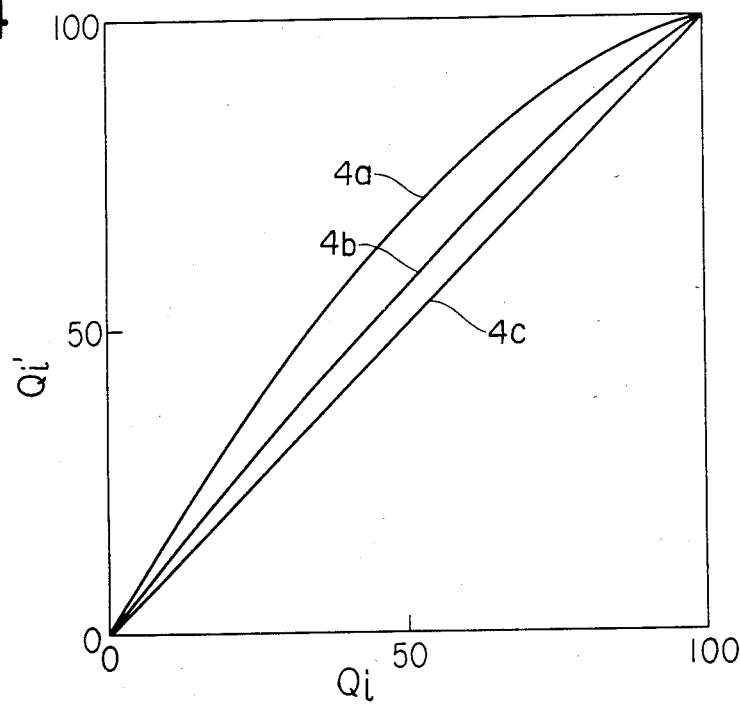
FIG. 4 is a graph for explaining a calculation of a correction amount according to the present invention.

The correction amount of the corrected digital image signal $Q_i'$ obtained by equation (3) is illustrated in the graph (FIG. 4) for $Q_{iM}$=100. Referring to FIG. 4, curves 4a and 4b indicate the correction amounts corresponding to the curves 3a and 3b of FIG. 3, respectively. A straight line 4c indicates a zero correction amount for HL=0 and SH=$D_{OM}$.

The linear correction section 7 shown in FIG. 1 converts the sampled digital image signal $Q_i$ to the corrected digital image signal $Q_i$ on the basis of the correction amount obtained in accordance with equation (3). Such a correction function can be realized using a microcomputer.

Figure 5:
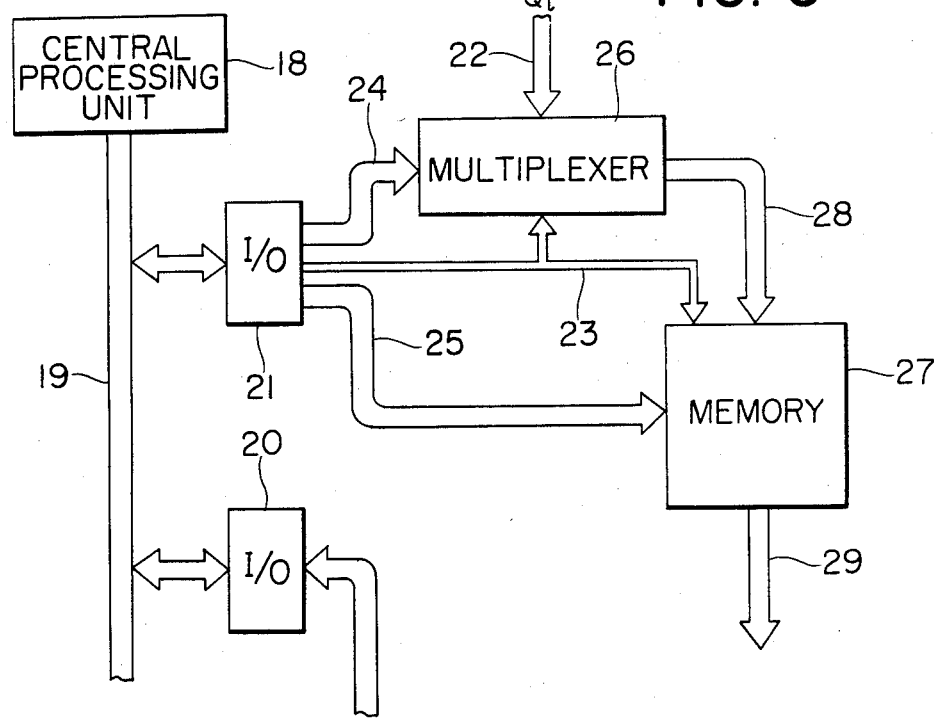
FIG. 5 is a block diagram of a linear correction section of the image processor shown in FIG. 1.

The linear correction section 7 for correcting a series of the sampled digital image signal array obtained when the scan rate of the original image is relatively high is illustrated in FIG. 5. Reference numeral 18 denotes a central processing unit (CPU) of a microcomputer for central processing and program storage; 19, a microbus; and 20 and 21, I/O interfaces, respectively. The following processing steps are performed in the microcomputer before an n-bit sampled digital image signal array 22 is corrected.

(Processing Step 1)

Data indicating the white density HL and the black density SH are fetched in the CPU 18 through the I/O interface 20 and a data bus 23.

(Processing Step 2)

The values of the corrected digital image signals $Q_i'$ corresponding to the sampled digital signals values of which correspond to 0 to $2^n-1$ are calculated in accordance with equation (3). The sampled digital image signals $Q_i$ are supplied onto a data bus 24, and the corrected digital image signals $Q_i'$ are supplied onto a data bus 25.

(Processing Step 3)

A write-mode signal 23 is supplied to a multiplexer 26 and a memory 27 every time a pair of digital image signals $Q_i$ and $Q_i'$ appear. When the write-mode signal 23 is set at logic level "0", the multiplexer 26 supplies the sampled digital image signal array 22 to an address line 28 of the memory 27. However, when the write-mode signal 23 is set at logic level "1", the multiplexer 26 connects the data bus 24 to the address line 28 and sets the memory 27 in the data write mode. The corrected digital image signal $Q_i'$ is written in a memory area at an address $Q_i$ of the memory 27.

(Processing Step 4)

After all the corrected digital image signals $Q_i'$ corresponding to the sampled digital image signals $Q_i$ the values of which correspond to 0 to $2^n-1$ are stored in the memory 27, the write-mode signal 23 is set to be logic level "0" so as to set the memory 27 in the data read mode. At the same time, the sampled digital image signal array 22 is coupled by the multiplexer 26 to the address line 28 of the memory 27. The data of the corrected digital image signals $Q_i'$ which are stored in the memory 27 by processing steps 1 to 3 are controlled to be read out onto an output data line 29.

According to the present invention as described above, the A/D converted and sampled digital image signal is converted in a predetermined manner controlled by the white and black densities of the original so as to perform linear correction between the input original (continuous tone image) and the recorded image (halftone image). When the present invention is applied to an image scanner/recorder wherein the input image signal proportional to light reflected by a continuous tone image is reproduced by a black-and-white binary dot image (halftone image), linear tone conversion between the image of the original and the recorded image is guaranteed. A deviation in tone reproduction in the conventional trial-and-error tone correction can be completely eliminated. Since the image processor has such an automatic linear tone correction function, the correction function serves as a control function to control the halftone image corresponding to optimal perception, thereby providing an excellent apparatus from the viewpoint of human engineering. Furthermore, a highly precise change in tone of the continuous tone image can be performed without trial-and-error.

Edge emphasis operation of the correcting means 16 shown in FIG. 2 will be described hereinafter. The correcting means 16 corresponds to the digital image signal processing section 8 (FIG. 1).

In the correcting means 16 (i.e., the digital image signal processing section 8 in FIG. 1), the analog image signals are read by the image reading means 14 and are quantized by the sampling means 15. Thereafter, linear correction of the sampled digital image signals is performed by the linear correction section 7 (FIG. 1). The corrected digital image signals are stored in the memory areas of the line memory which are selected in synchronism with image scanning. The corrected digital image signals are sequentially read out in a given order and are delayed by a predetermined period. The delayed digital signals are used for edge emphasis operation. As a result, the conventional complex optical system can be simplified while guaranteeing highly precise image signals for a sharp image.

Figure 6:
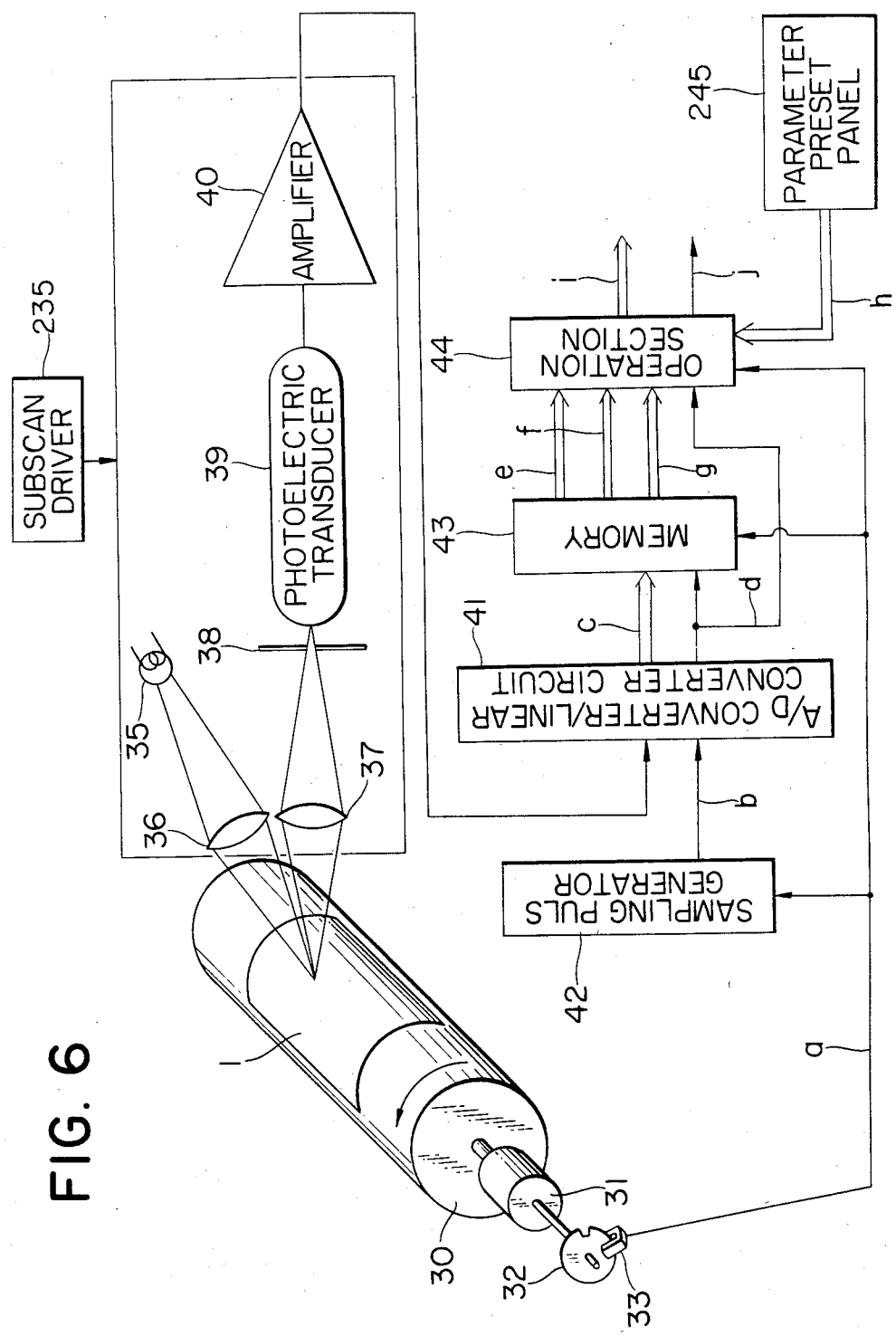
FIG. 6 is a block diagram showing an image reading means, a sampling means and a correcting means of the image processor shown in FIG. 1.
Figure 7:
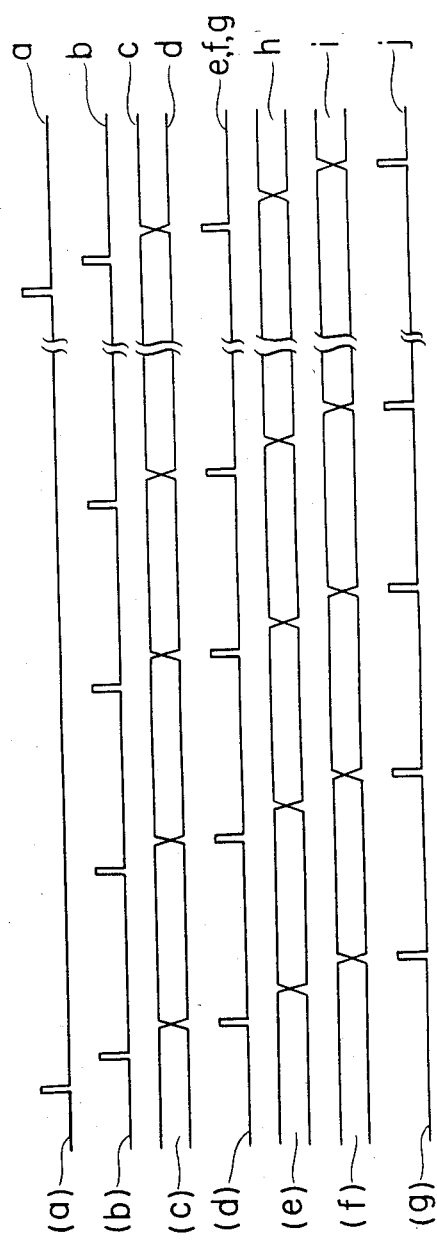
FIG. 7 is a timing chart of main signals of the image reading means shown in FIG. 6.

FIG. 6 shows an edge emphasis means and the detailed image reading means 14. FIG. 7 is a timing chart of signals of the main part of the circuit shown in FIG. 6. A drum 30, which has an outer surface on which the original 1 is adhered, is rotated by a drive motor 31. A disc 32 having a notch for generating a phase signal is mounted on a shaft of the drum 30, and is placed so as to pass through a phase signal generator 33 according to rotation of the drum 30. The phase signal generator 33 generates one phase signal a (FIG. 7) upon one revolution of the drum 30. A subscan carriage 34 having an optical system thereon is driven to reciprocate along the axial direction of the drum 30 by a subscan driver 235 at a speed corresponding to the axial scan density. The optical system including a light source 35, lenses 36 and 37, an aperture 38, a photoelectric transducer 39 and an amplifier 40 is disposed on the subscan carriage 34. Light from the light source 35 through the lens 36 illuminated the original 1 adhered to the surface of the drum 30. Light reflected by the original 1 is converged by the lens 37 and is focused through the aperture 38. The aperture 38 has a size corresponding to the scan density. Light passing through the aperture is transduced by the photoelectric transducer 39 to an electric signal. This electric signal is then amplified by the amplifier 40. The amplified signal is supplied to an A/D converter 41. A sampling pulse generator 42 is initialized in response to the phase signal a upon each revolution of the drum 30 and generates a sampling pulse b having a frequency corresponding to the scan density. The A/D converter/linear correction circuit 41 converts the input analog image signal from the amplifier 40 in response to the sampling pulse b and linearly corrects the sampled digital image signal. The A/D converter/linear correction circuit 41 generates a corrected digital image signal c and a clock d. It should be noted that the A/D converter and the linear correction circuit are regarded as a single unit (the A/D converter/linear correction circuit 41) in FIG. 6 for the sake of simplicity although they are shown as separate circuits in FIG. 1. A memory 43 comprises a line memory having a plurality of 17 memory areas respectively corresponding to 17 main scanning lines. N−8 data e, N data f and N+8 data g are read out from the memory 43 and are supplied to a calculation section 44. The operation section 44 uses an edge emphasis constant k from a parameter preset panel 45 to process the N−8 data e, the N data f and the N+8 data g and generates output data i and an output clock j. The memory 43 and the calculation section 44 will be described in detail hereinafter with reference to the accompanying drawings.

Figure 8:
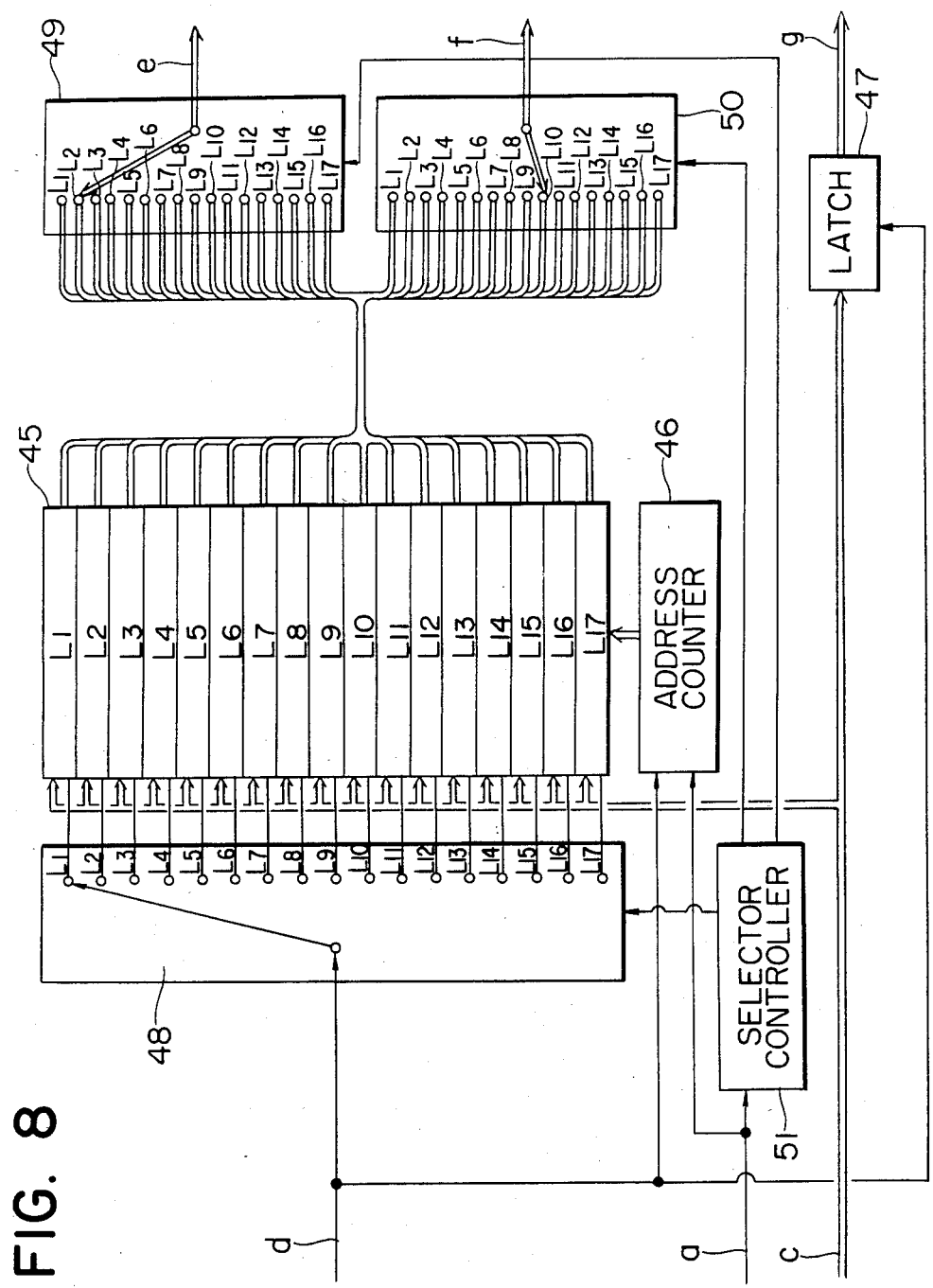
FIG. 8 is a block diagram of a memory of the circuit shown in FIG. 6.

FIG. 8 is a detailed diagram of the memory 43. A line memory 45 has a memory capacity for 17 main scanning lines, and input data terminals, output data terminals, read/write control terminals and an address control terminal. An address counter 46 is reset in response to the phase signal a for every main scanning line and is counted up in response to the clock d. An output from the address counter 46 is supplied to the address control terminal of the line memory 45 so as to designate a pixel position in the main scan direction. The sampling data c is supplied to the input data terminals of the line memory 45 and is latched by a latch 47 in response to the clock d. The latched sampling data c is produced as the N+8 data g from the latch 47. A write selector 48 selects one of the read/write control terminals of the line memory 45 and supplies the clock d thereto, so that the selected data area of the line memory is set in the write mode. The remaining memory areas of the line memory 45 are set in the read mode. An N−8 selector 49 and an N selector 50 select one of the output data terminals of the line memory 45 and generate the N−8 data e and the N data f, respectively. Each of the write selector 48, the N−8 selector 49 and the N selector 50 selects a memory area having the predetermined line number corresponding to the given main scanning line M (=1, 2, 3, ...), as shown in Table 1, under the control of a selector controller 51 which is, in turn, controlled by the phase signal a.

TABLE 1

| Main scanning line number (M = 0, 1, 2, ...) | Write selector | N selector | N − 8 selector |
| --- | --- | --- | --- |
| 17M + 1 | L1 | L10 | L2 |
| 17M + 2 | L2 | L11 | L3 |
| 17M + 3 | L3 | L12 | L4 |
| 17M + 4 | L4 | L13 | L5 |
| 17M + 5 | L5 | L14 | L6 |
| 17M + 6 | L6 | L15 | L7 |
| 17M + 7 | L7 | L16 | L8 |
| 17M + 8 | L8 | L17 | L9 |
| 17M + 9 | L9 | L1 | L10 |
| 17M + 10 | L10 | L2 | L11 |
| 17M + 11 | L11 | L3 | L12 |
| 17M + 12 | L12 | L4 | L13 |
| 17M + 13 | L13 | L5 | L14 |
| 17M + 14 | L14 | L6 | L15 |
| 17M + 15 | L15 | L7 | L16 |
| 17M + 16 | L16 | L8 | L17 |
| 17M + 17 | L17 | L9 | L1 |

Figure 9:
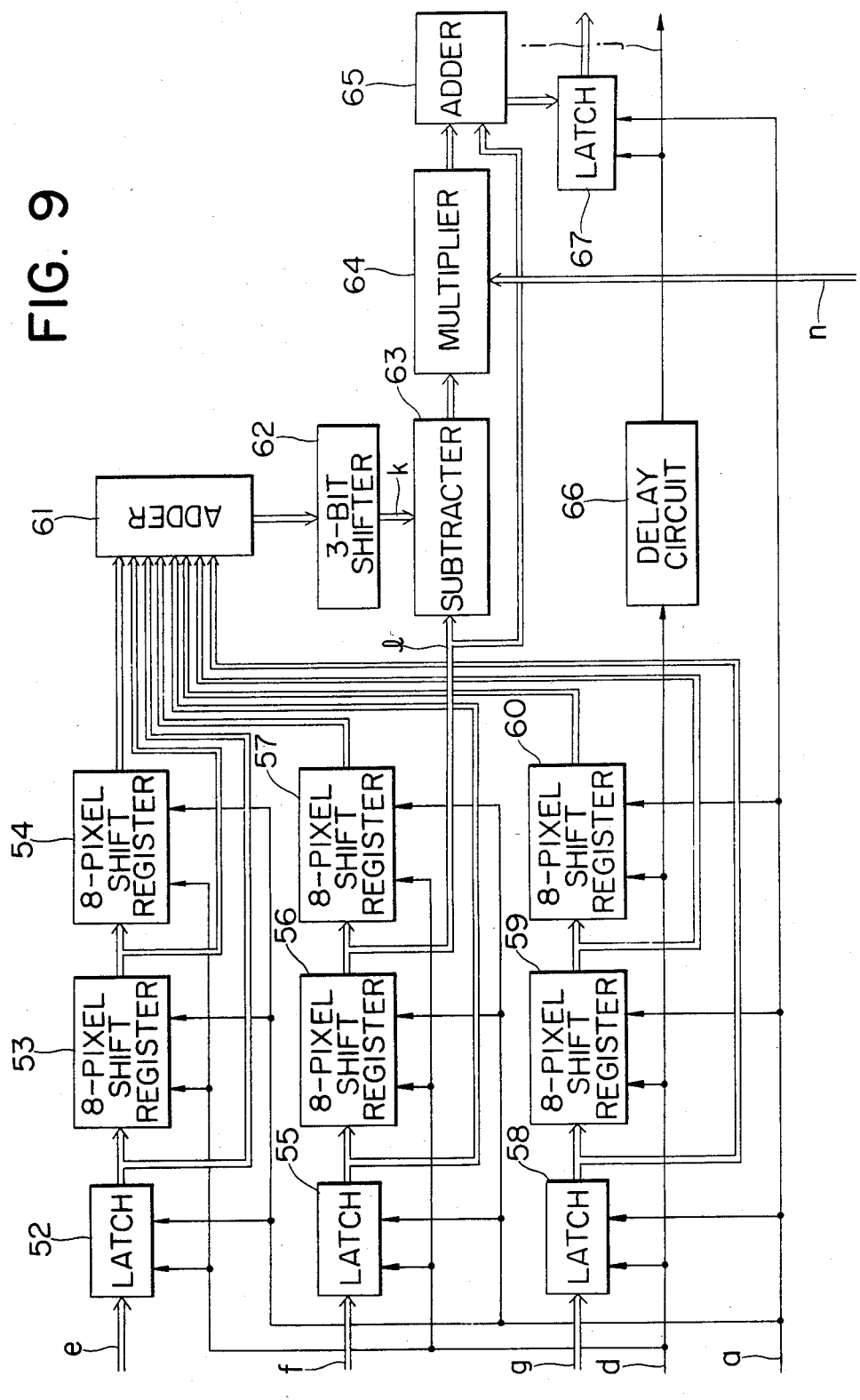
FIG. 9 is a block diagram of a calculation section of the circuit shown in FIG. 6.

FIG. 9 shows a detailed block diagram of the calculation section 44. A latch 52 and 8-pixel shift registers 53 and 54 are connected in series with each other to constitute a 17-pixel shift register. The clock d is supplied to the latch 52 and the 8-pixel shift registers 53 and 54. The 17-pixel shift register shifts the data in each pixel clock d. The 17-pixel shift register is reset in response to the phase signal a in each main scanning line. A set of a latch 55 and 8-pixel shift registers 56 and 57 and a set of a latch 58 and 8-pixel shift registers 59 and 60 are identical to the latch 52 and 8-pixel shift registers 53 and 54. The 17-pixel shift registers respectively comprising the above sets receive the clock d and the phase signal a. The N−8 data e from the memory 43 is supplied to the latch 52; the N data f, to the latch 55; and the N+8 data g, to the latch 58, respectively. These signals are respectively supplied to the 17-pixel shift registers. The outputs from the latches 52, 55 and 58 and the 8-pixel shift registers 53, 54, 56, 57, 59 and 60 are supplied to an adder 61. The sum data from the adder 61 is shifted by a 3-bit shifter 62 to divide it by 8, thereby obtaining unsharp data k. An output from the 8-pixel shift register 56 is supplied as sharp data l to a subtracter 63 wherein the unsharp data k is subtracted from the sharp data l. An output from the subtracter 63 is supplied together with an edge emphasis parameter n to a multiplier 64. An output from the multiplier 64 is added by an adder 65 to the sharp data l. A delay circuit 66 delays the clock d by a time interval corresponding to the operation time of the subtracter 63. The delayed clock is supplied to a latch 67, and the latch 67 latches the output from the adder 65 in each pixel clock d, thereby setting the output data i. The output from the delay circuit 66 is also generated as an output clock j. The latch 67 is reset in response to the phase signal a in each main scanning line in the same manner as any other circuit.

Figure 10:
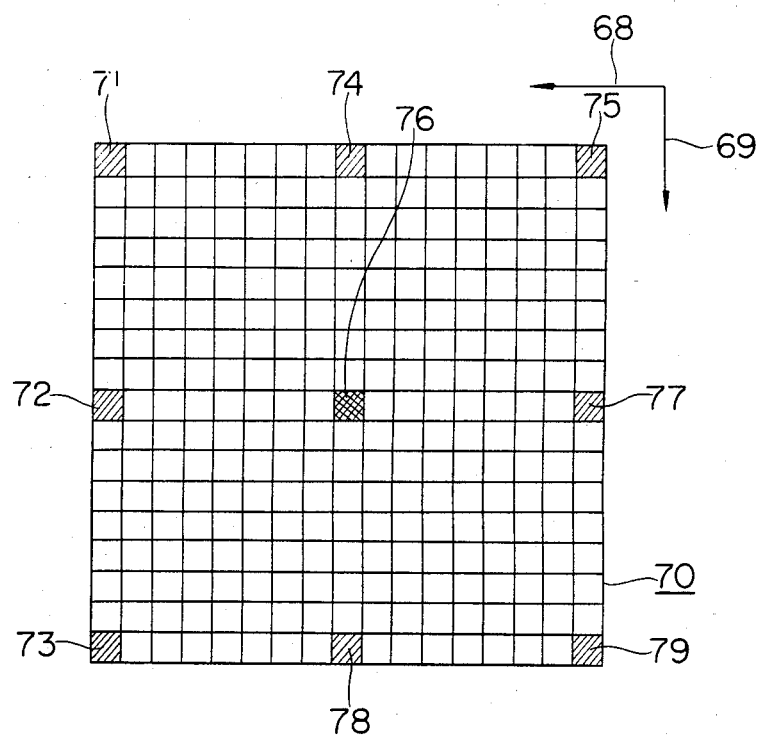
FIG. 10 shows a scanning window of the image processor shown in FIG. 1.

FIG. 10 is a diagram for explaining the operation of the calculation section 44 (FIG. 9) from a different point of view.

An arrow 68 indicates the main scan direction, and an arrow 69 indicates the subscan direction. Each square area of the matrix indicates one pixel. Therefore, a scanning window 70 comprises a matrix having 17 pixels along the main scan direction and 17 pixels along the subscan direction. Pixels 71, 72 and 73 (FIG. 10) correspond to the outputs from the latches 52, 55 and 58 (FIG. 9), respectively. Pixels 74, 75, 76, 77, 78 and 79 (FIG. 10) correspond to the outputs from the 8-pixel shift registers 53, 54, 56, 57, 59 and 60 (FIG. 9), respectively. In this embodiment, the original 1 is scanned by shifting the scanning window along the main scan direction in each pixel. After one scanning line is scanned, the scanning window is shifted in the subscan direction by one pixel, and main scanning is again performed. The above scanning operation is repeated.

If the values of the pixels 71 to 79 are given as D1, D2, D3, D4, D5, D6, D7, D8 and D9, respectively, and a value of the edge emphasis parameter n is given as K, a value A of the sharp data l, a value B of the unsharp data k, and a value OUT of the output data are given as follows:

$$B=(\tfrac{1}{9})(D1+D2+D3+D4+D5+D6+D7+D8+D9)$$

$$A=D5$$

$$OUT=A+K(A-B)$$

In the above embodiment, the scanning window 70 has the 17×17-pixel matrix. However, in order to render the size of the scanning window variable, the line data areas of the line memory 45 in FIG. 8 may be increased corresponding to the number of pixels along the subcan direction of the scanning window. The write selector 48, the N−8 selector 49 and the N selector 50 are modified to allow selection of arbitrary number of the line memory areas. Furthermore, the selector controller 51 is also modified to be loaded the data shown in Table 1. In addition to the above modifications, the 8-pixel shift registers 53, 54, 56, 57, 59 and 60 are modified to have enough stage to store the pixels along the main scan direction of the arbitrary determined scanning window and modified to be able to read out from arbitrary determined stages. Thus, a scanning window having any size can be obtained. According to the arrangement described above, the structure becomes complicated, but the scanning window is not limited to a given size, thereby allowing arbitrary selection of a scanning window having a desired size.

Figure 11:
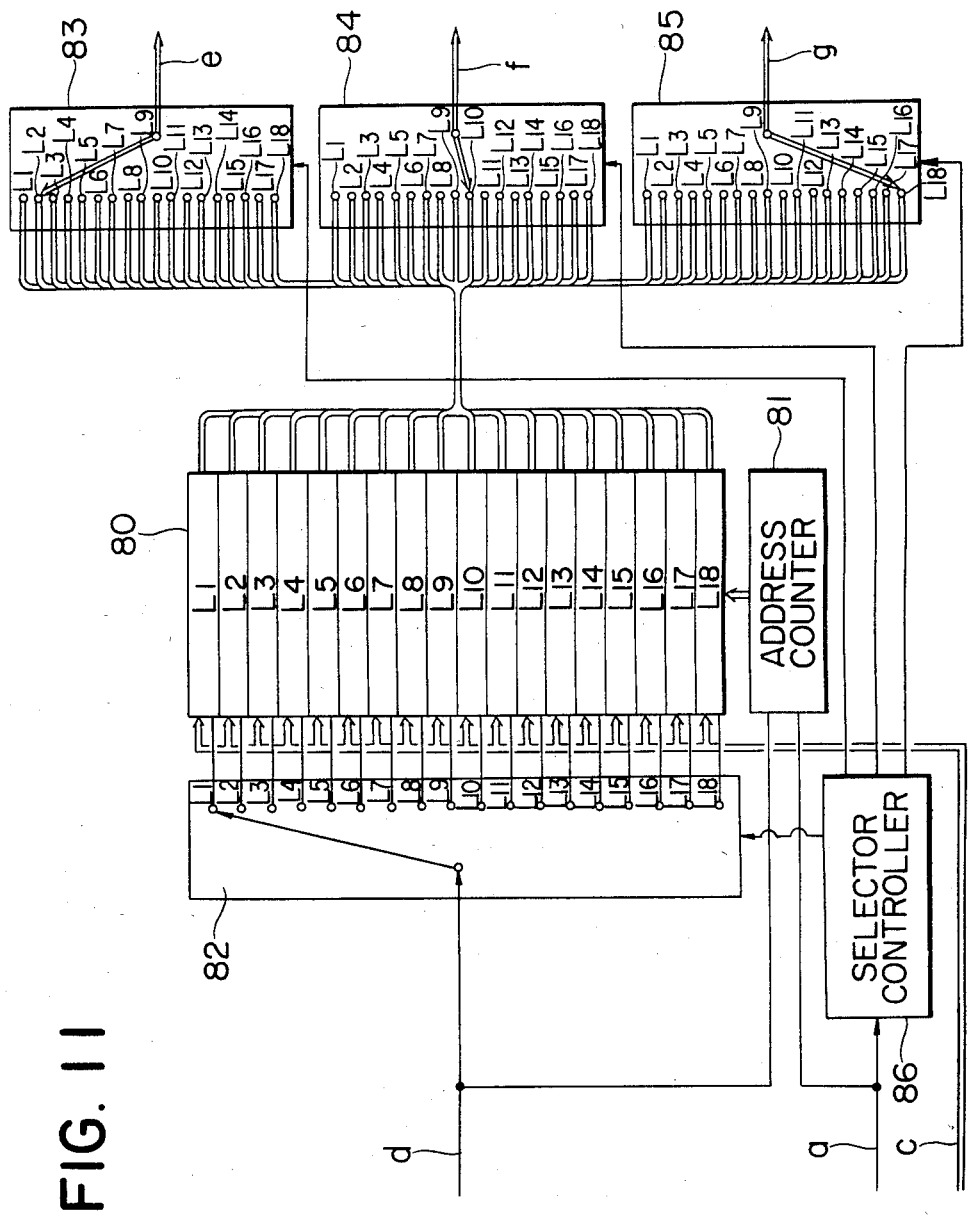
FIG. 11 is a block diagram of a memory of an image processor according to another embodiment of the present invention.

A memory 43 of an image processor according to another embodiment of the present invention will be described with reference to FIG. 11.

A line memory 80 has a capacity corresponding to 18 main scanning lines, and input data terminals, output data terminals, read/write control terminals, and an address control terminal. An address counter 81 is reset in response to a phase signal a in each main scanning. The address counter 81 is counted up in response to a clock d. An output from the address counter 81 is supplied to the address control terminal of the line memory 80 so as to determine the image position along the main scan direction.

Sampling data c is applied to the input data terminals of the line memory 80. A write selector 82 supplies the clock d to one of the read/write control terminals of the memory areas corresponding to 18 main scanning lines of the line memory 80. The selected memory area is set in the write mode, and the remaining memory areas are set in the read mode. An N−8 selector 83, an N selector 84 and an N+8 selector 85 select one of the data areas of the line memory 80 and generate N−8 data e, N data f and N+8 data g, respectively. The write selector 82, the N−8 selector 83, the N selector 84 and the N+8 selector 85 are controlled by a selector controller 86 controlled in response to the phase signal a, as shown in Table 2, so as to select a given data area of the corresponding main scanning line M (=1, 2, 3, ...).

According to this embodiment, all the data are bypassed through line memory 80 and selectors of the same configuration separately control the data, thereby simplifying the configuration of the memory 43.

TABLE 2

| Main scanning line number (M = 1, 2, ...) | Write selector | N + 8 selector | N selector | N − 8 selector |
|---|---|---|---|---|
| 18M + 1 | L1 | L18 | L10 | L2 |
| 18M + 2 | L2 | L1 | L11 | L3 |
| 18M + 3 | L3 | L2 | L12 | L4 |
| 18M + 4 | L4 | L3 | L13 | L5 |
| 18M + 5 | L5 | L4 | L14 | L6 |
| 18M + 6 | L6 | L5 | L15 | L7 |
| 18M + 7 | L7 | L6 | L16 | L8 |
| 18M + 8 | L8 | L7 | L17 | L9 |
| 18M + 9 | L9 | L8 | L18 | L10 |
| 18M + 10 | L10 | L9 | L1 | L11 |
| 18M + 11 | L11 | L10 | L2 | L12 |
| 18M + 12 | L12 | L11 | L3 | L13 |
| 18M + 13 | L13 | L12 | L4 | L14 |
| 18M + 14 | L14 | L13 | L5 | L15 |
| 18M + 15 | L15 | L14 | L6 | L16 |
| 18M + 16 | L16 | L15 | L7 | L17 |
| 18M + 17 | L17 | L16 | L8 | L18 |
| 18M + 18 | L18 | L17 | L9 | L1 |

According to the correcting means 16 (i.e., the digital signal processing section 8 in FIG. 1) as described above, a single optical system is used to read the image, and the analog image signals are quantized by the A/D converter and corrected by the linear correction circuit. The corrected digital image signals are stored in the data areas of the line memory which are synchronized with scanning. Furthermore, delayed image signals are used to perform edge emphasis. As a result, stable, precise image signals for a sharp image can be obtained by using a simple optical system, thereby providing an inexpensive image processor.

The image processing means 17a of the processed image data generating means 17 shown in FIG. 2 will be described hereinafter. The image processing means 17a corresponds to the dot generator 9 in FIG. 1.

The image processing means 17a (i.e., the dot generator 9 in FIG. 1) of the processed image data generating means 17 allows changes in dot shape and dot pitch of the halftone image. Dots here mean the black-and-white binary dots used in newspaper photographs, printed pictures, and facsimile pictures in order to express a halftone image. Formation of dots will be first described to best understand the operation of the image processing means 17a.

FIGS. 12(A) to 12(C) are representations for explaining formation of dots (i.e., conversion from the original data in terms of a continuous tone image to binary data in terms of a halftone image), in which FIG. 12(A) shows the data of the original, FIG. 12(B) shows threshold data, and FIG. 12(C) shows binary data. Each original data $D_{ij}$ (where i and j are natural numbers, respectively) is compared with the corresponding threshold data $S_{ij}$. If the original data $D_{ij}$ is larger than the threshold data $S_{ij}$, binary data $P_{ij}$ of logic level "1" (black) is produced. Otherwise, binary data $P_{ij}$ of logic level "0" (white) is produced. Therefore, when the specification of the threshold data $S_{ij}$ is changed, the shape of the screen-mesh constructed with a plurality of the binary dots can be changed. In FIG. 12(B), the number of threshold data $S_{ij}$ is the same as that of the original data $D_{ij}$. However, in practice, the number of threshold data is smaller than that of the original, and a resultant scanning window of threshold data is repeatedly used. The scanning window size may be arbitrarily determined (e.g., 4×4, 8×8, or 16×16 matrix). Furthermore, the dot pitch can be changed in accordance with the specification of the threshold data $S_{ij}$ and the scanning window size.

Figure 13A:
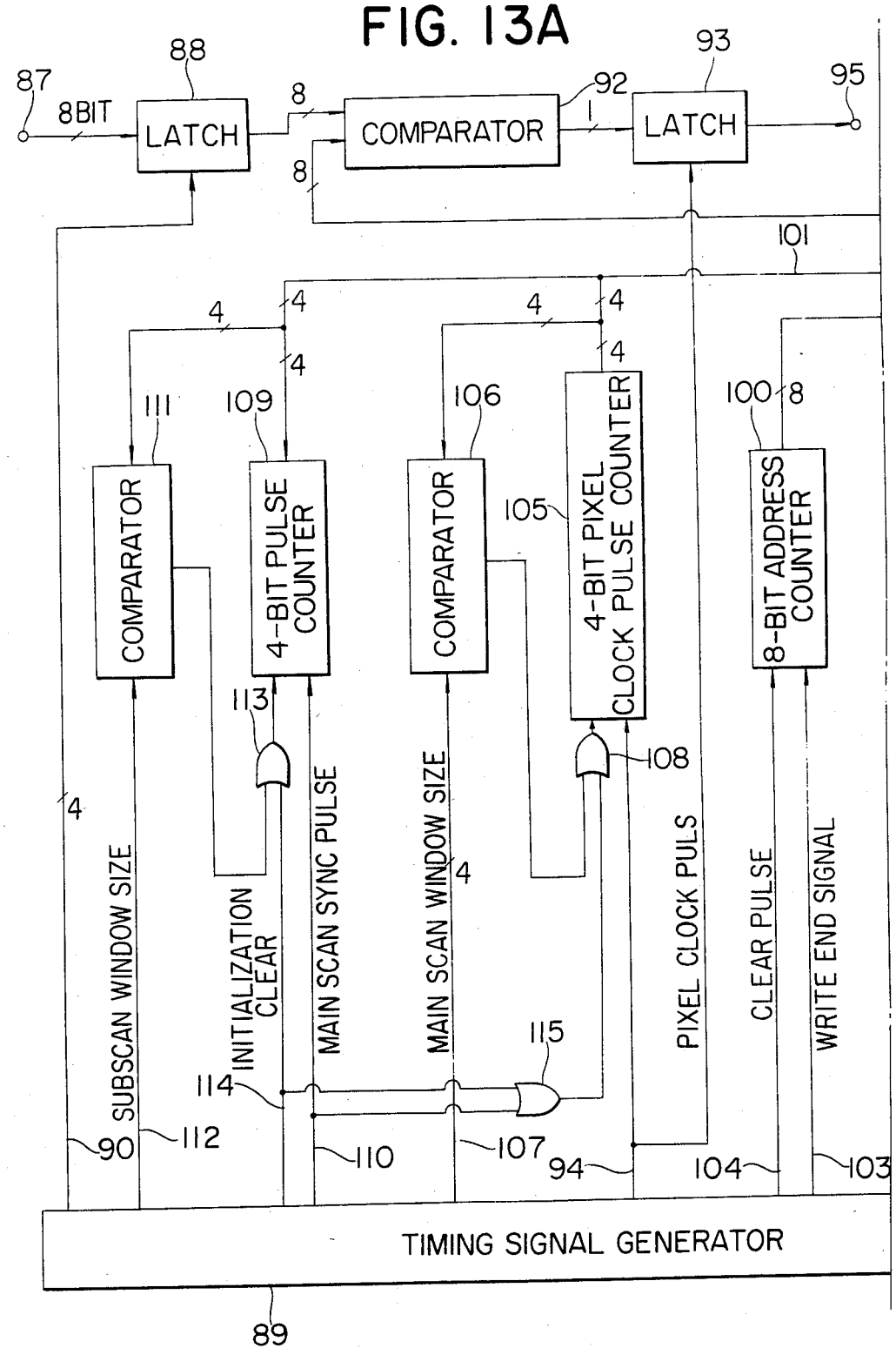
FIG. 13 is a block diagram showing the main part of an image processing means.

The image processing means 17a for forming binary dots is shown in FIG. 13.

The 8-bit sampled digital image signal A/D-converted by the sampling means 15 (FIG. 2) is corrected by the correcting means 16 and is latched by a latch 88 through an input terminal 87. The latch timing is determined by a latch pulse supplied from a timing signal generator 89 onto a signal line 90 (the timing signal generator 89 generates signals associated with the timing signals for the image reading means 14, the sampling means 15 and the correcting means 16). The 8-bit output data from the latch 88 is compared by a comparator 92 with the 8-bit threshold data from a memory 91. When the output data from the latch 88 is equal to or greater than the threshold data, the comparator 91 generates a signal of logic level "1". Otherwise, the comparator 91 generates a signal of logic level "0". A latch 93 receives the output signal supplied from the comparator 92 and supplies it to a computer 17b (FIG. 2) or a recorder 17c (FIG. 2) through an output terminal 95 in response to a pixel clock pulse supplied from the timing signal generator 89 onto a signal line 94.

Any other circuit arrangement of the circuit shown in FIG. 13 is associated with threshold data control. Therefore, the data format of the threshold data will be described.

FIGS. 14(A) to 14(C) show the threshold data in the memory 91. FIG. 14(A) shows a threshold scanning window. The horizontal direction corresponds to the main scan direction, and the vertical direction corresponds to the subscan direction. In this embodiment, the scanning window has a maximum matrix of 16×16 threshold data. The threshold data $S_{ij}$ of this scanning window are stored in the memory 91, as shown in FIG. 14(B). The memory 91 comprises an 8×256-bit RAM (random access memory). The addresses 00 to FF illustrated at the left-hand side from the top to the bottom are designated in hexadecimal notation. FIG. 14(C) shows an 8-bit selector for designating the address of the memory. The lower 4-bits serve as a counter for counting the pixel clocks along the main scan direction, and the upper 4-bits serve as a counter for counting the pixel clocks along the subscan direction. Therefore, the contents of the 8-bit selector in FIG. 14(C) are used to access all the addresses of the RAM shown in FIG. 14(B), thereby entirely scanning the image with the threshold pattern shown in FIG. 14(A).

Referring again to FIG. 13, reference numeral 96 denotes a tristate buffer. The tristate buffer 96 passes the signal (threshold data) supplied from the timing signal generator 89 onto an 8-bit signal line 98 when a write mode signal supplied from the timing signal generator 89 onto a signal line 97 is set at logic level "1". The threshold data is then stored in the memory 91. When the write mode signal is set at logic level "0", the buffer 96 is opened. However, when the write mode signal drives the memory 91 and is set at logic level "1", the buffer serves to set the memory 91 in the write mode. When the write mode signal drives the memory 91 and is set at logic level "0", the buffer 96 serves to set the memory 91 in the read mode and drives a selector 99. When the write mode signal is set at logic level "1", the buffer 96 receives as a write address data an output from an 8-bit address counter 100. However, when the write mode signal is set at logic level "0", the buffer 96 selects as a read address data the 8-bit signal on a signal line 101. A write clock pulse appears on a signal line 102 connected to the timing signal generator 89, and a write end pulse appears on a signal line 103 connected thereto. These signals serve as clock pulses of the counter 100. A clear pulse appears on a signal line 104 in the write mode so as to clear the counter 100. Reference numeral 105 denotes a 4-bit pixel clock pulse counter. The pulse counter 105 counts the pixel clock pulses appearing on the signal line 94. An output from the counter 105 appears on the signal line 101 and serves as the lower 4-bit signal of the 8-bit read address signal. A comparator 106 compares the 4-bit signal supplied from the timing signal generator 89 onto a signal line 107 with the 4-bit signal from the counter 105. When the output from the counter 105 is larger than the signal appearing on the signal line 107, the comparator 106 clears the counter 105 through an OR gate 108. The signal on the signal line 107 indicates how many times the threshold scanning window (FIG. 14(A)) is used for pixels along the main scan direction. For example, when the scanning window is used eight times, a numeral 7 is specified. Reference numeral 109 denotes a 4-bit pulse counter which is synchronized with main scanning. The counter 109 counts the main scanning synchronous pulses on a signal line 110. An output from the counter 109 is used as an upper 4-bit data of the 8-bit read address signal on the signal line 101. Reference numeral 111 denotes a comparator which compares the 4-bit signal supplied from the timing signal generator 89 onto a signal line 112 with the 4-bit output signal from the counter 109. When the output from the counter 109 is larger than the signal on the signal line 112, the comparator 111 clears the counter 109 through an OR gate 113.

The signal on the signal line 112 indicates how many times the threshold scanning window (FIG. 14(A)) is repeatedly used for the pixels along the subscan direction. For example, when the scanning window is repeatedly used eight times, a numeral 7 is specified. The main scanning synchronous pulse supplied from the timing signal generator 89 onto the signal line 110 clears the counter 105 through an OR gate 115 and the OR gate 108. This is performed to determine the readout position of the threshold data at the beginning of main scanning. Signals from a signal line 114 are used to clear the counters 105 and 109 before scanning. The signals are used to clear the counter 105 through the OR gates 115 and 108, and the counter 109 through the OR gate 113.

Figure 15:
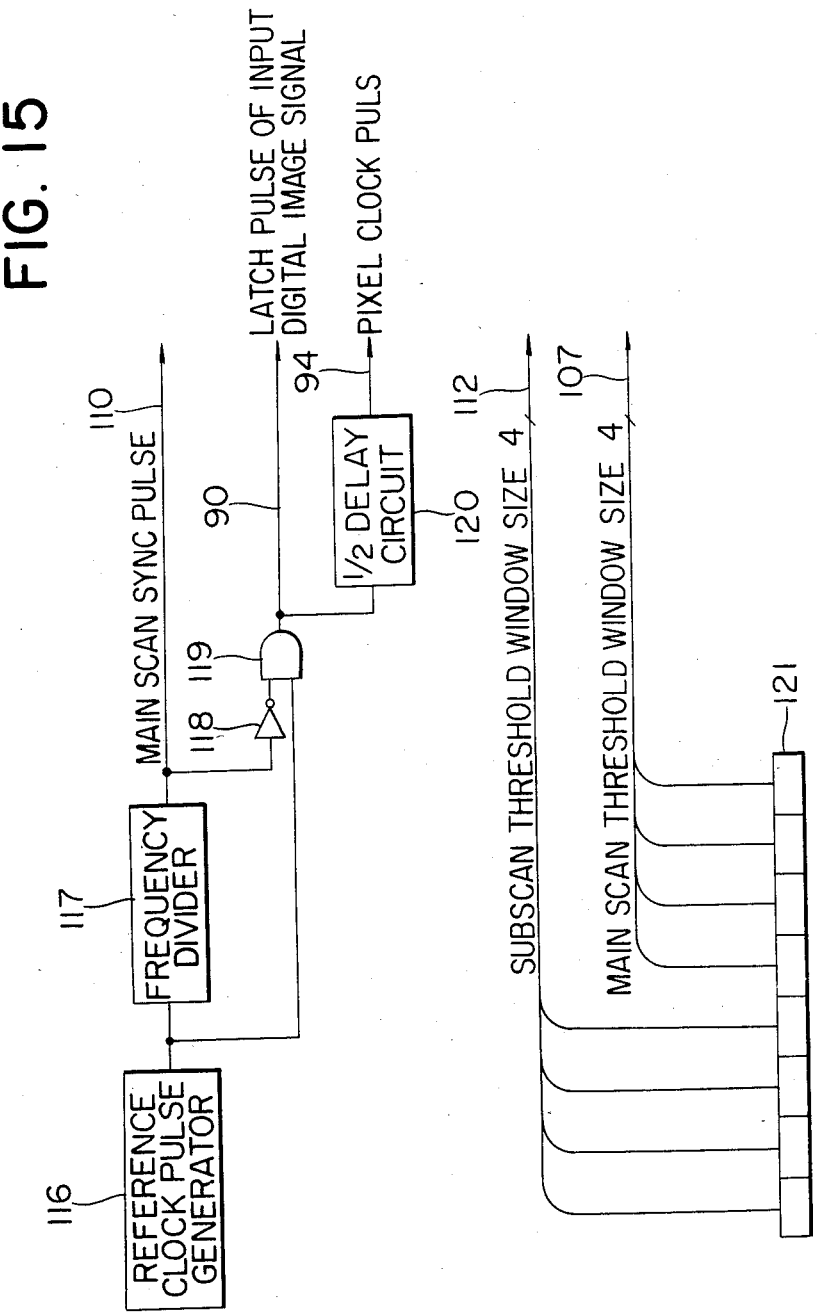

FIGS. 15 and 16 show the main part of the timing signal generator 89 shown in FIG. 13.

Referring to FIG. 15, reference numeral 116 denotes a reference clock pulse generator. An output pulse from the generator 116 is frequency-divided by a frequency divider 117. The frequency divider 117 generates a main scanning synchronous pulse onto the signal line 110. The main scanning synchronous pulse is inverted by an inverter 118, and the reference clock pulse is gated by an AND gate 119 so as to supply the latched pulse of the sampled digital image signal onto the signal line 90. The latched pulse on the signal line 90 is delayed by a delay circuit 120 by ½ period of the reference clock pulse period. The delayed signal appears as the pixel clock pulse on the signal line 94. Reference numeral 121 denotes a register wherein the upper four bits on the signal line 112 provide the threshold scanning window size along the subscan direction and the lower four bits on the signal line 107 provide the threshold scanning window size along the main scan direction. It should be noted that the contents of the register 121 are externally preset.

Referring to FIG. 16, reference numeral 122 denotes a data file having several sets of threshold data. Reference numeral 123 denotes a command input terminal, data of which are entered by an operator. Data from the command input terminal is supplied to an operation circuit 124, and in turn, the operation circuit 124 causes the data file to supply data through an interface 125 to proper portions in the image processing means. For example, data of a #1 threshold scanning window size is read out from the data file 122 and is written in the register 121 (FIG. 15) or is supplied onto the signal line 98 (FIG. 13). The operation circuit 124 of FIG. 16 controls the write clock pulse on the signal line 102 (FIG. 13), the write mode signal on the signal line 97, and operation of the image processing means 17a (FIG. 13) for generating the binary dot signals in accordance with instructions from the command input terminal 123 (FIG. 16).

According to the image processing means 17a, by changing the threshold scanning window data and the threshold scanning window size, various types of lumped-dot shapes and lumped-dot pitches are prepared in advance in the threshold table. A desired lumped-dot shape and a desired lumped-dot pitch can be used to obtain binary dot signals.

When the threshold scanning window size comprises a 1×1 threshold data matrix, normal binary processing can be performed.

An image reading means 14 shown in FIG. 2 will be described in detail according to still another embodiment shown in FIG. 17. The image reading means partially differs from that shown in FIG. 2. In particular, the image reading means of this embodiment can continuously and effectively process a plurality of originals disposed in an original reading range.

Figure 17A:
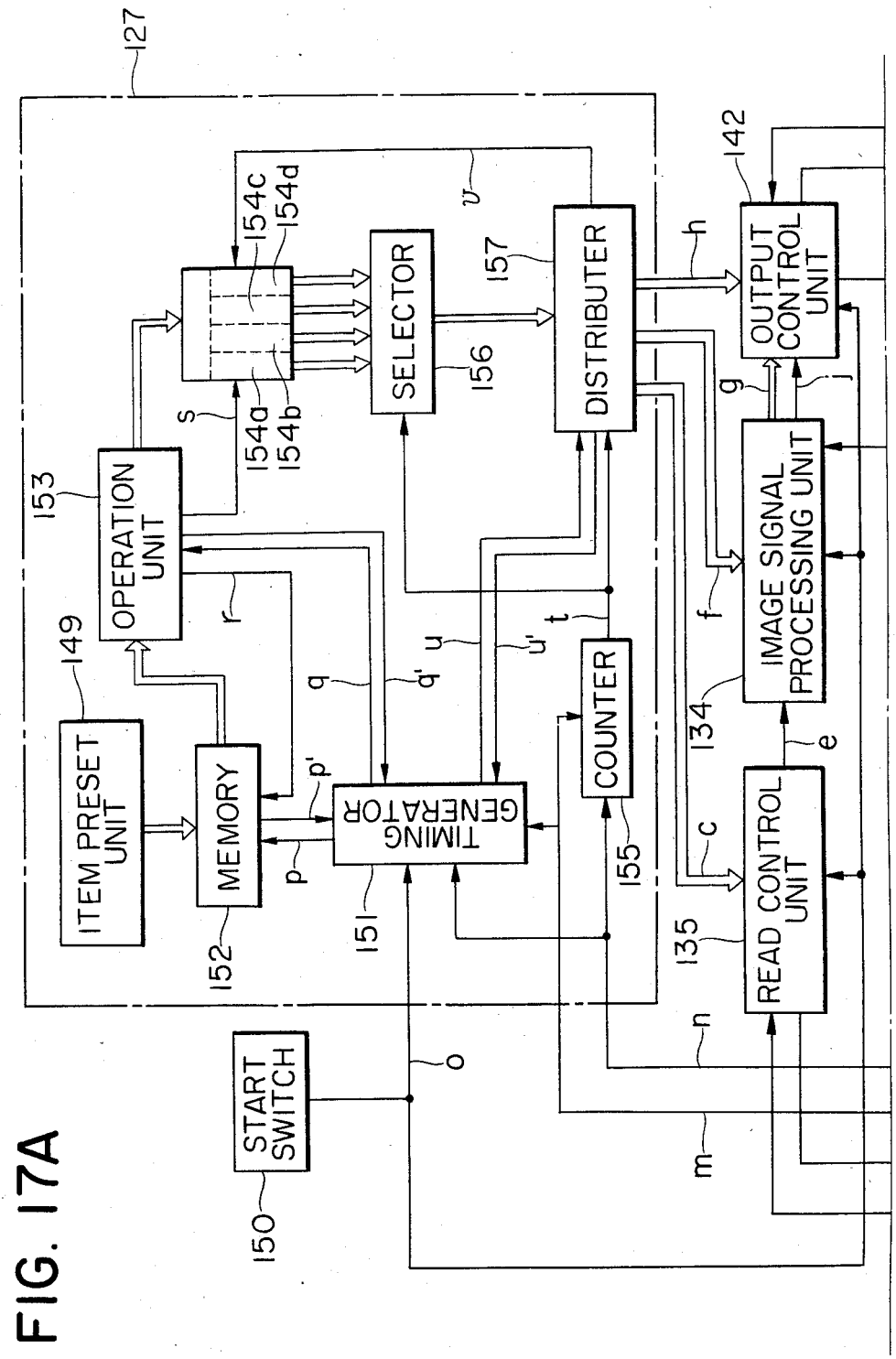
FIG. 17 is a block diagram showing the schematic configuration of an image reading means according to still another embodiment of the present invention.

FIG. 17 shows an image reading means 14 using a drum-type original image scanner/recording system. Referring to FIG. 17, reference numeral 126 denotes an original area designation section; and 127, a control item designation section for designating various control items. A plurality of originals 1a, 1b, 1c and 1d are aligned along the subscan direction of a reading drum 129 that is, the axial direction of the drum rotated by a main-scanning motor unit 128 along the main scan direction that is, the rotary direction of the drum. These originals are photoelectrically scanned with light from a photoelectric transducer unit 133 mounted on a carriage 132 which is moved by a subscanning motor unit 130 and a feed screw 131 along the subscan direction. Analog image signals from the photoelectric transducer unit 133 are supplied to an image signal processing unit 134. The image signal processing unit 134 corresponds to the sampling means 15, the correcting means 16 and the image processing means 17a of the processed image data generating means 17 of FIG. 2. By way of simplicity, these means are regarded as a single block comprising the image signal processing unit 134.

The original reading mechanism is controlled by a reading control unit 135 for generating a subscanning read signal d and an image signal sampling synchronous signal e in accordance with the main scanning synchronous signal b from the main motor unit 128 and a readout control parameter c from the control item designation section 127. In this embodiment, the original area designation section 126 signals the scanning area of the plurality of originals 1a, 1b, 1c and 1d to the control item designation section 127, thereby executing continuous reading of the plurality of originals.

Figure 14:
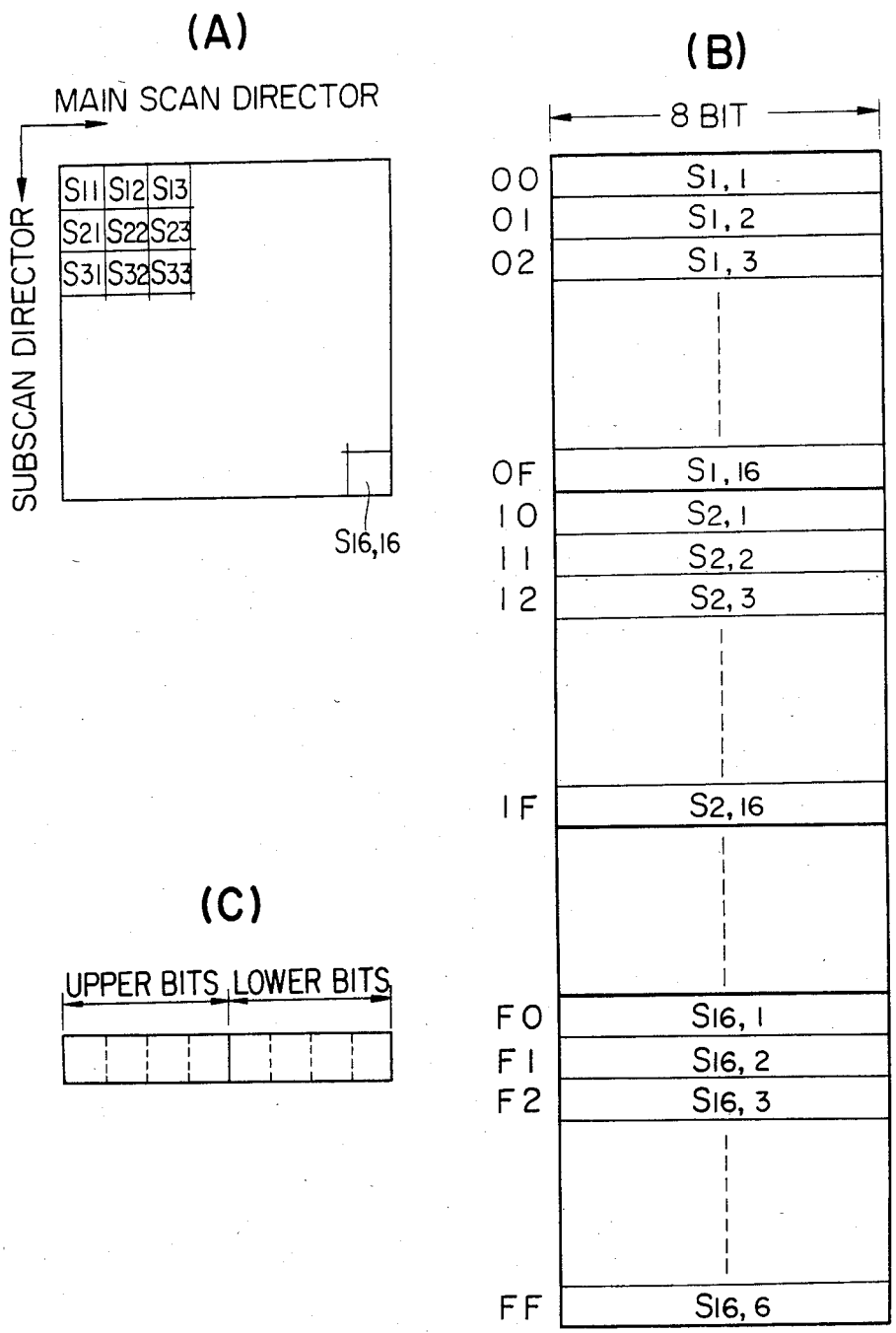
FIGS. 14(A) to 14(C) show the format of threshold data in a memory.

Furthermore, in this embodiment, the sampled digital image signal a is variously processed in response to the image signal processing parameter f from the control item designation section 127 by using the image signal processing unit 134 having the functions of converting the analog image signal by the A/D converter 6 (FIG. 1) to obtain the sampled digital image signal, correcting the sampled digital image signal a by the edge emphasis means (FIG. 6) for edge emphasis, and processing the binary image signal g by graphic processing such as trimming or binary dot formation (FIG. 14). The halftone signal g is recorded by an output control unit 142 in accordance with the output control parameter h from the control item designation section 127. The output control unit 142 controls the recording mechanism which has a recording drum 136, a main-scanning motor unit 137, a sub-scanning motor unit 138, a moving screw 139, a carriage 140 and an optical modulation reading unit 141 for recording. As a result, an original image scanner/recorder corresponding to the recorder 17c (FIG. 2) can be obtained as a reading means. The output control unit 142 is synchronized with the recording mechanism in response to the sync signals i and j respectively from the main motor unit 137 and the image processing unit 134. The output control unit 142 supplies the subscanning drive signal k to the sub-scanning motor unit 138 so as to process the output image signal g. The recording image signal l is supplied to the optical modulation unit 141 on the carriage 140. The optical modulation unit 141 supplies an optical modulation signal to record the original images 1a' and 1b' on a photosensitive recording material 143 on the recording drum 136.

Figure 18:
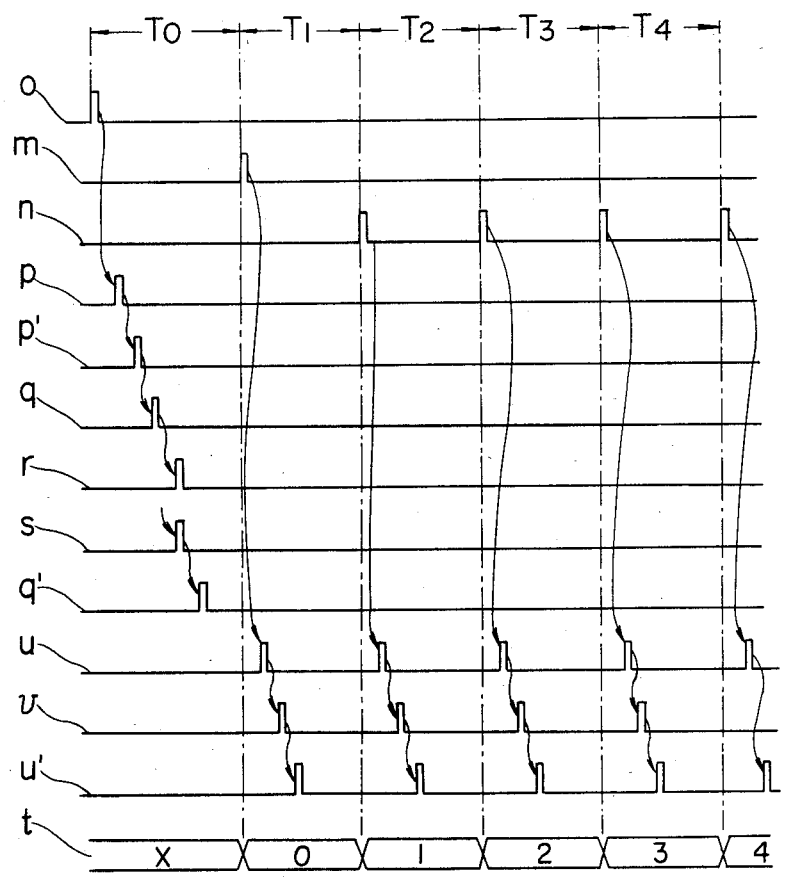
FIG. 18 is a sequence diagram of main control signals of the circuit shown in FIG. 17.

In the original area designation section 126, a starting position indicator for reading 145 which is aligned with the subscanning start position of the reading drum 129 is semipermanently fixed on a linear support 144 parallel to the moving screw 131. Position indicator knobs 146a, 146b, 146c and 146d are disposed to be slidable along the linear support 144 and are aligned with the subscanning end positions of the originals 1a, 1b, 1c and 1d. Object detectors 147 and 148 such as microswitches or magnetic sensors are arranged on the carriage 132 to detect the positions of the read start position indicator 145 and the position indicator knobs 146a, 146b, 146c and 146d. This position detection is performed on a line extending from the image read position of the photoelectric transducer unit 133. When the carriage 132 passes by the read start position indicator 145, the object detector 147 supplies a read start signal m to the control item designation section 127. Furthermore, when the carriage 132 passes by each of the position indicator knobs 146a, 146b, 146c and 146d, an original end signal n is supplied to the control item designation section 127. FIG. 18 shows the sequence of the main signals of the control item designation section 127. In the control item designation section 127, using the read start signal m and the original end signals n during time intervals $T_1$, $T_2$, $T_3$ and $T_4$, the processing time intervals of the originals 1a, 1b, 1c and 1d can be checked. The operation of the control item designation section 127 will be described using the diagram showing the sequence of the main signals of FIG. 18.

Along with rapid recent developments in image processing in facsimiles and computers, an original image scanner and an original image scanner/recorder system used for these units is proposed wherein continuous tone images as well as black-and-white documents can be properly processed. In the scanner and/or the scanner/recorder of this type, various control items must cover many items such as a slicing level for binarization, edge emphasis, control of tone scale conversion in image processing, magnification and/or reduction, controls concerning trimming and image signal sampling, and record/output controls for a normal positive, a reverse positive, a normal negative and a reverse negative. According to this embodiment of the present invention, the control item designation section 127 is used to designate the control items of each of a plurality of originals. More particularly, the control item designation section 127 comprises an item preset unit 149 and a timing generator 151. The item preset unit 149 comprises a combination of digital switches, a keyboard and a CRT display, and presets for each of the originals 1a, 1b, 1c and 1d the control items such as magnification/reduction data supplied to the reading control unit 135, original scanning density data, tone correction data, edge emphasis data, and selection data (between black-and-white image and continuous tone image) which are supplied to the image signal processing unit 134, and normal/reverse image recording data supplied to the output control unit 142. The timing generator 151 supplies a control signal to the main parts of the control item designation section 127 in synchronism with a start signal o from a start switch 150, the read start signal m and the original end signal n. A memory 152 stores the control item data of each original which is supplied from the item preset unit 149 in response to a memory write signal p which is synchronized with the start signal o generated from the timing generator 151. When all the preset item data are stored in the memory 152, the memory 152 supplies a write end signal p' to the timing generator 151. The timing generator 151 supplies a calculation synchronous signal g to a calculation unit 153 in synchronism with the write end signal p'. The calculation unit 153 reads out the control item data from the memory 152 in response to the calculation synchronous signal p and performs conversion operation of the data in the data formats required for the reading control unit 135, the image signal processing unit 134 and the output control unit 142. The calculated results are stored as parameters in memory areas 154a, 154b, 154c and 154d of a memory 154, respectively corresponding to the originals. The calculation unit 153 then supplies a calculation-end signal g' to the timing generator 151. A memory read signal r and a memory write signal s are timing signals of the calculation unit 153 and the memory 152 and the memory 154. A counter 155 arranged in the control item designation section 127 is reset in response to the read start signal m and counts pulses of the original end signal n. An output from the counter 155 is supplied as a count signal t to a selector 156 and a distributor 157. In this embodiment, the count signal t is increased in an order of 0, 1, 2 and 3 in response to the read start signal m and the original end signal N. The count of 0 indicates that the carriage 132 is positioned at the first original (i.e., original 1a); the count of 1 indicates that the carriage 132 is positioned at the second original (i.e., original 1b); the count of 2 indicates that the carriage 132 is positioned at the third original (i.e., original 1c); and the count of 3 indicates that the carriage 132 is positioned at the fourth original (i.e., original 1d). These counts correspond to the time intervals $T_1$, $T_2$, $T_3$ and $T_4$ of FIG. 18, respectively. The selector 156 selects the path of the control parameters from the memory area 154a, 154b, 154c and 154d in response to the given count of the count signal t and supplies them to the distributor 157. More particularly, when the count of the count signal t is set at 0, the memory area 154a is selected; when the count is set at 1, the memory area 154b is selected; when the count is set at 2, the memory area 154c is selected; and when the count is set at 3, the memory area 154d is selected. In the distributor 157 in accordance with the given count of the count signal t, the control item parameters are selectively read out from the memory area 154a, 154b, 154c or 154d of the memory 154 in synchronism with a distribution synchronous signal u which is generated in the timing generator 151 using the read start signal m and the original end signal n. And then, according to a determined procedure, the distributor 157 classifies the control item parameters into a reading control parameter c, an image signal processing parameter 5, and an image signal processing parameter h, and supplies respectively them to the reading control unit 135, the image signal processing unit 134, and the output control unit 142. When such distribution is completed, the distributor 157 supplies a distribution end signal u' to the timing generator 151. A memory read signal v is a timing signal between the distributor 157 and the memory 154. When the count of the count signal t has reached four, the distributor 157 supplies a prestored reset parameter to the image signal processing unit 134, the reading control unit 135, and the output control unit 142.

During the time interval $T_0$ in FIG. 18, the scanner/recorder is initiated upon depression of the start switch 150, and the carriage 132 is moved to the read start position of the reading drum 129. In other words, mechanical movement is performed during this time interval. In the image processor of this type, the time interval $T_0$ is long enough to perform operations wherein the control item data are read out from the item preset unit 149 and are stored as the converted parameters in the memory areas of the memory 154.

Figure 19:
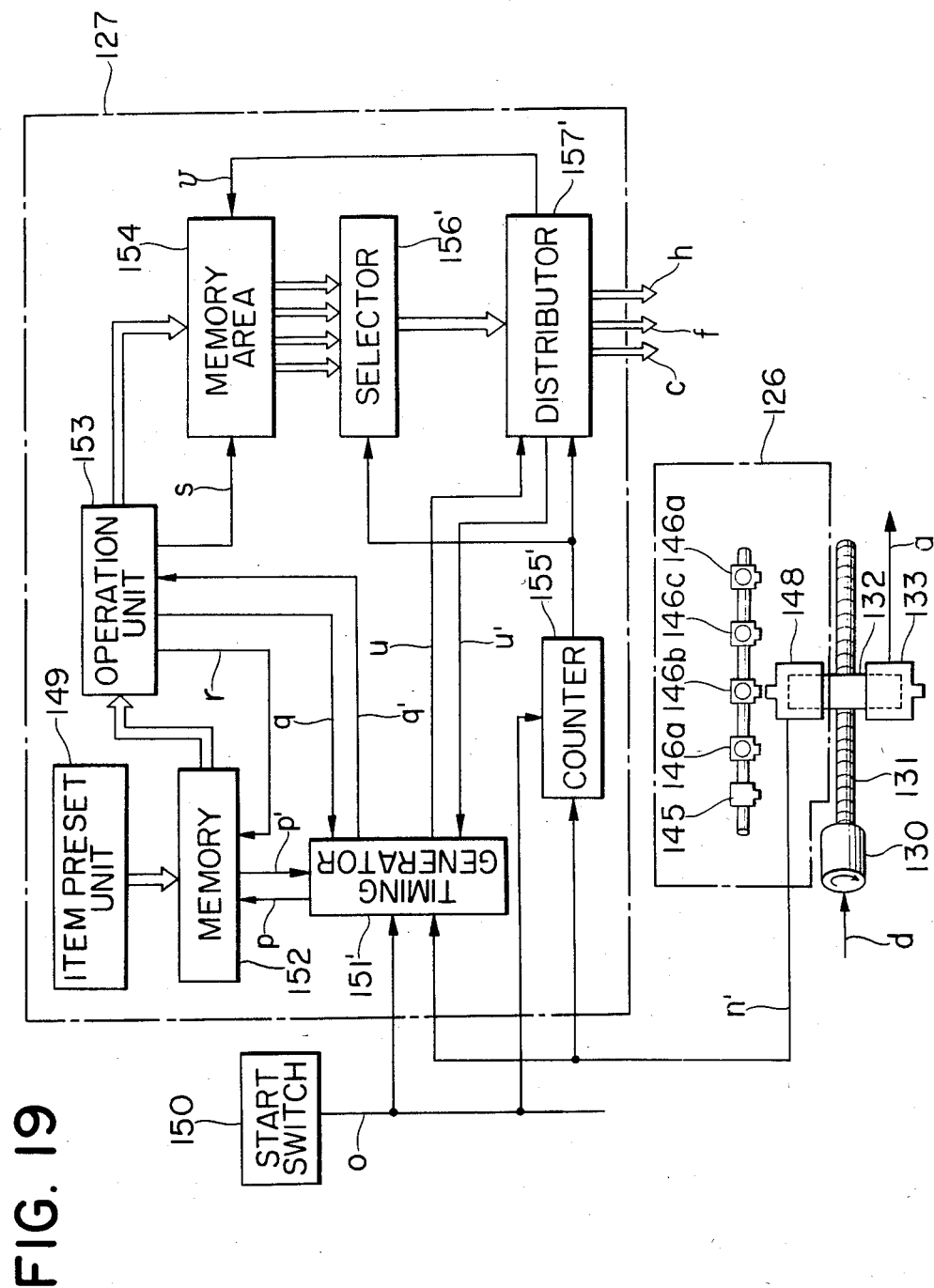
FIGS. 19 and 20 are respectively diagrams showing the main parts according to still other embodiments of the present invention.

FIG. 19 shows an original area designation section 126 and a control item designation section 127 of a scanner/recorder according to still another embodiment of the present invention. An object detector 148 arranged on a carriage 132 also detects a reading start position indicator 145. An original end signal n' including a reading start signal o is supplied to a counter 155' and a timing generator 151'. The counter 155' is reset in response to the start signal o. A count signal t' is synchronized with the original end signal n', and the count of the count signal t' changes in the order of 0, 1, 2, 3, 4 and 5. Therefore, an output from a selector 156' is not coupled to any one of memory areas of the memory 154 when the count of the count signal t' is set at 0. The counts of 1, 2, 3 and 4 of the count signal t' allow selection of memory areas 154a, 154b, 154c and 154d, respectively. When the count of the count signal t' is set at 0, a distributor 157' does not distribute the control parameters. The distributor 157' distributes the control parameters in response to a distribution synchronous signal u so as to distribute a reading control parameter c, an image signal processing parameter f and an output control parameter h only when the count is set at 1, 2, 3 or 4. When the count of o the count signal t' has reached five, the prestored reset parameter is supplied to the control units 134, 135 and 142, which are then reset.

Figure 20:
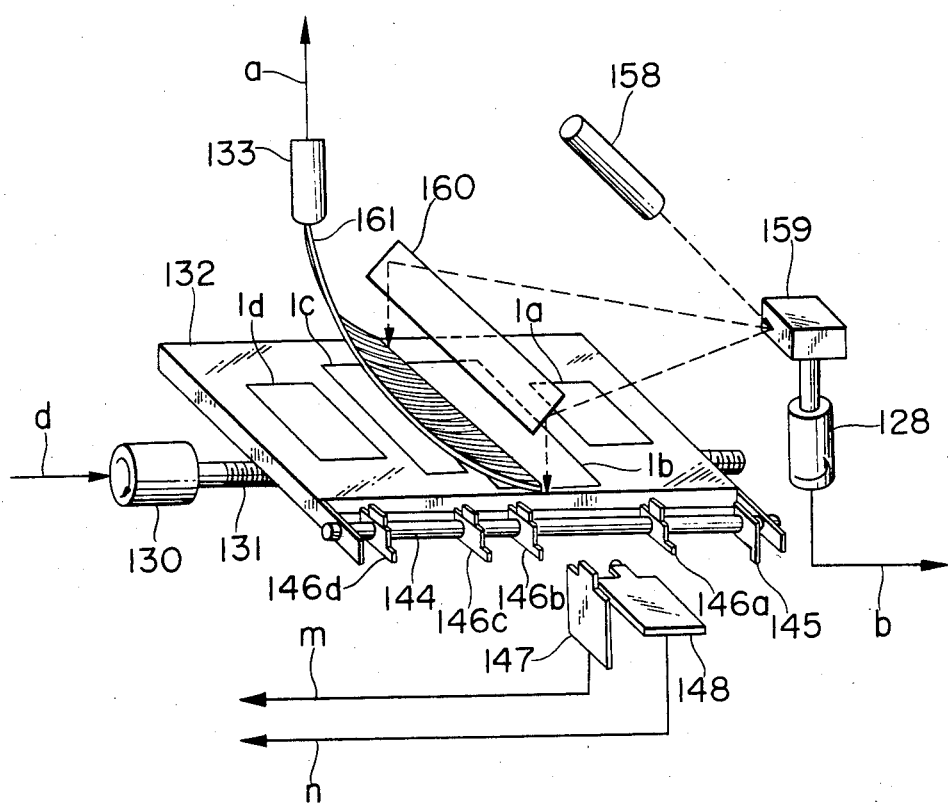

FIG. 20 shows an original area designation section 126 having a flat-bed type scanning mechanism. Referring to FIG. 20, reference numeral 158 denotes a light source for optical scanning; 159, a rotating mirror; 128, a main scanning motor unit for rotating the rotating mirror 159 in the main scan direction; 160, a reflector; and 161, an optical fiber. In order to perform two-dimensional scanning, a carriage 132 mounted on a moving screw 131 serves as an original carriage; the scanning position of the light is not moved in the sub-scanning direction. Therefore, a linear support 144 is fixed at the side of the original carriage 132. Slidable position indicator knobs 146a to 146d and a read start position indicator 145 are arranged on the linear support 144. Object detectors 147 and 148 are fixed along a line extending from the fixed light scanning position. By using the original area designation section 126 having the structure described above, the same effect is obtained as in the scanner/recorder shown in FIG. 17.

In the embodiment shown in FIG. 17, the output control unit 142 has the function of controlling the recording mechanism. However, as shown in FIG. 2, it is easy to modify the output control unit so as to control an interface coupled to a computer, a transmission control unit, or an image display unit for transmitting image data to a remote area through a transmission line.

In each image reading means shown in FIG. 17, 19 or 20, four originals are used. However, the number of originals can be increased by increasing the number of position indicator knobs in accordance with a maximum number of originals.

In order to continuously process originals the number of which is smaller than that of position indicator knobs, additional control item data for each original number item or for each original are set by the item preset unit 149. After processing the number of originals set by the calculation unit 153 and the distributor 157, the processor can be initialized.

According to the image reading means described above, there is provided the original area designation section 126 wherein a plurality of position indicator knobs for detecting the end positions of the originals are slidably disposed on the linear support of the reading mechanism which is aligned along the subscan direction, and are detected by the object detector during subscanning. Furthermore, there is also provided the control item designation section 127 for presetting the control item data of each original in the item preset unit 149, for calculating the control parameters of each original in accordance with the item data, and for distributing the control parameters to the control units 134, 135 and 142 by using the read start signal and original end signal which are supplied from the original area designation section 126. Therefore, a plurality of originals can be scanned with a single movement in the sub scanning direction. Compared with the conventional image reading means wherein a single movement in the subscanning direction is used for a single original, the image reading means shown in FIG. 17, 19 or 20 can more efficiently perform image scanning. Furthermore, the item preset unit 149 can preset the control item data of the next original immediately after the start switch 150 is depressed, thereby greatly improving the efficiency of image processing.

An image reading means and a recorder 17c which differs from the image reading means shown in FIG. 17, 18, 19 or 20 will be described according to still another embodiment of the present invention shown in FIG. 21.

In the image recording means and the recorder to be described below, a single laser beam from a single laser source is split into two laser beams by an optical beam splitter, and the two beams irradiate respectively different surfaces of a single rotating polygon mirror in the image reading mode and the image recording mode, thereby simplifying the configuration of the optical system and providing stable, precise scanning.

Figure 21:
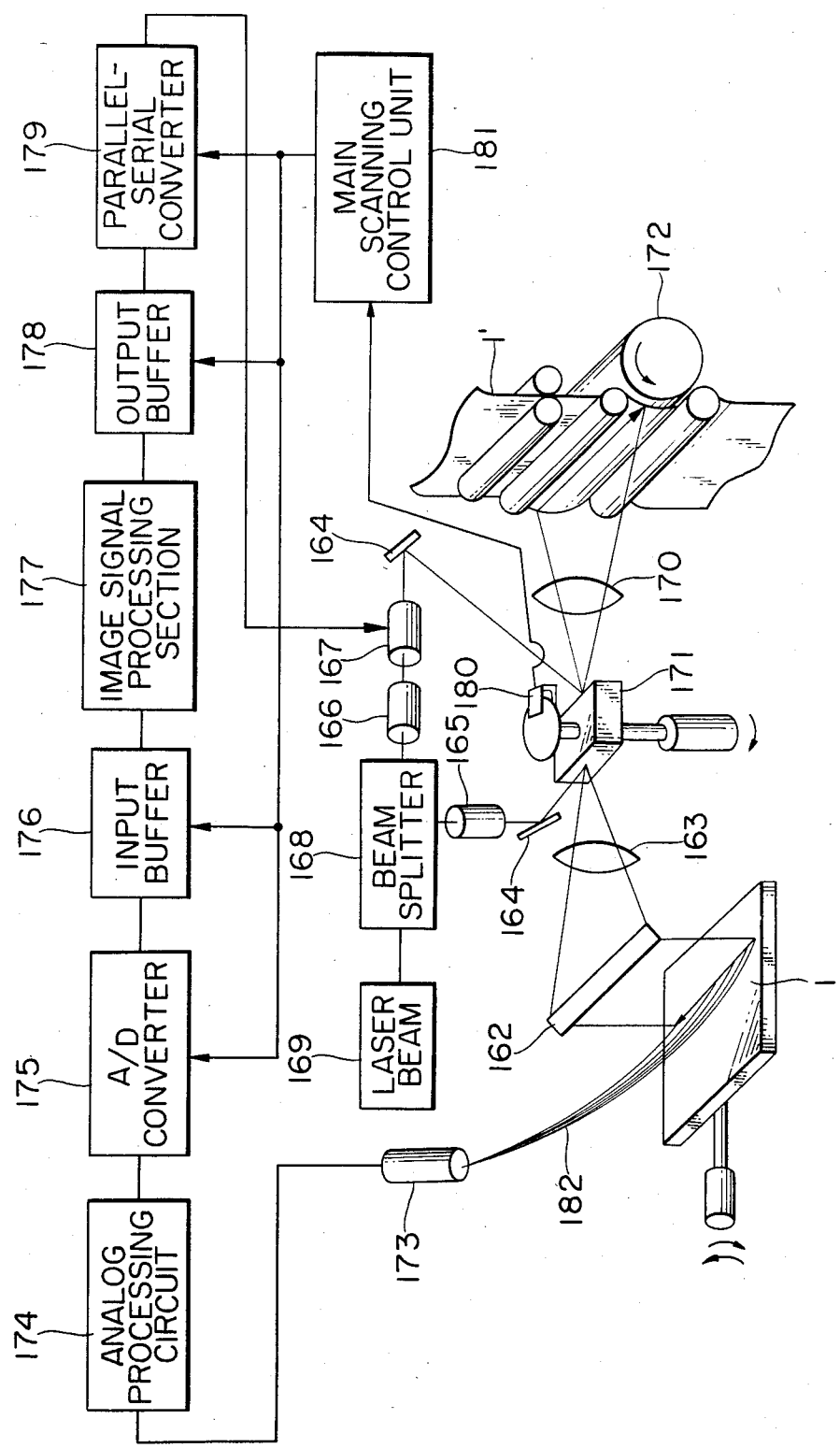
FIG. 21 is a diagram of an image processor according to still another embodiment of the present invention.

FIG. 21 is a schematic diagram showing the image reading means and the recorder. Reference numeral 1 denotes an original placed on an image reader carriage; 162, a reflector; 163, a f$\theta$ lens for image scanning; 164, a direction conversion mirror; 165 and 166, beam expanders, respectively; 167, an optical modulator; 168, a beam splitter; 169, a laser; 170, a f$\theta$ lens for image scanning; 171, a rotating polygon mirror; 1', recording paper; 172, a drum for paper feed; 173, a photomultiplier; 174, an analog processing circuit; 175, an A/D converter; 176, an input buffer; 177, an image signal processing section; 178, an output buffer; 179, a parallel-serial converter; 180, a mirror surface-index sensor; 181, a main scanning control circuit; and 182, a bundle of plastic fibers.

It should be noted that the image signal processing section 177 performs linear correction, edge emphasis, and screen-dot formation as previously described, so that a detailed description thereof will be omitted.

The image data can be scanned in the following manner. A beam from the laser 169 mounted on an optical bench is split by the beam splitter 168 into a reading laser beam and a recording laser beam. The read laser beam is expanded by the beam expander 165 and is reflected by the rotating polygon mirror 171. The laser beam reflected by the rotating polygon mirror 171 is converged through the fθ lens 163 and the reflector 162 so as to have a predetermined beam spot-size on the original 1. The laser beam reflected by the original 1 is guided to the photomultiplier 174 through the bundle 182 of plastic fibers and is transduced to an input analog signal corresponding to the density of the original 1. This input analog image signal is supplied to the image signal processing circuit 177 through the analog processing section 174, the A/D converter 175 and the input buffer 176. The image signal processing circuit 177 performs tone correction and edge emphasis using A/D converted image signals and then, generates a binary image signal. The binary image is supplied to the parallel-serial converter 179 through the output buffer 178. The parallel-serial converted signal is supplied to the optical modulator 167.

Meanwhile, the recording laser beam being split in the beam splitter 168 is expanded by the beam expander 166 and is modulated by the optical modulator 167 according to the binary image signal. The modulated recording laser beam is converged by the rotating polygon mirror 171 and the fθ lens 170 to have a beam spot corresponding to the determined scanning line density. The beam spot is thus formed on the recording paper 1' for main scanning. Subscanning is performed by moving the optical bench in the horizontal direction and rotating the drum 172 to feed the recording paper 1' by a drive motor.

Furthermore, according to this embodiment, a mirror surface-index sensor 180 serves to detect mirror surfaces of the rotating polygon mirror 171. The mirror surface-index sensor 180 supplies an index of the mirror surface to a main scanning control circuit 181 upon the time when the mirror surface mark on the disk passes through the sensor. The main scanning control circuit 181 supplies synchronous pulse to the processing sections 175, 176, 178 and 179 after receiving the index, thereby simultaneously performing image reading and image recording.

According to this image reading means and the image recording, since the different mirror surfaces of the rotating polygon mirror 171 are simultaneously used for image reading and image recording, with two laser beams from only one laser source, comparing to the conventional scanner/recorder wherein two lasers are used for reading and recording, respectively, the optical system can be simplified. Furthermore, reading and recording errors can be precisely corrected for example, jitter correction and pitch irregularity correction since a single rotating polygon mirror is used. As a result, a highly precise image processor can be obtained as a whole, thereby effectively providing an image scanning/recording means for simultaneously reading input analog image signals and recording the processed signals.

A recording paper control unit as part of the recorder 17c shown in FIG. 2 will be described.

The recording paper control unit serves to control a length of the recording paper to be cut, and to minimize an unexposed portion between the end of the recorded portion and the cut position of the recording paper.

Figure 22:
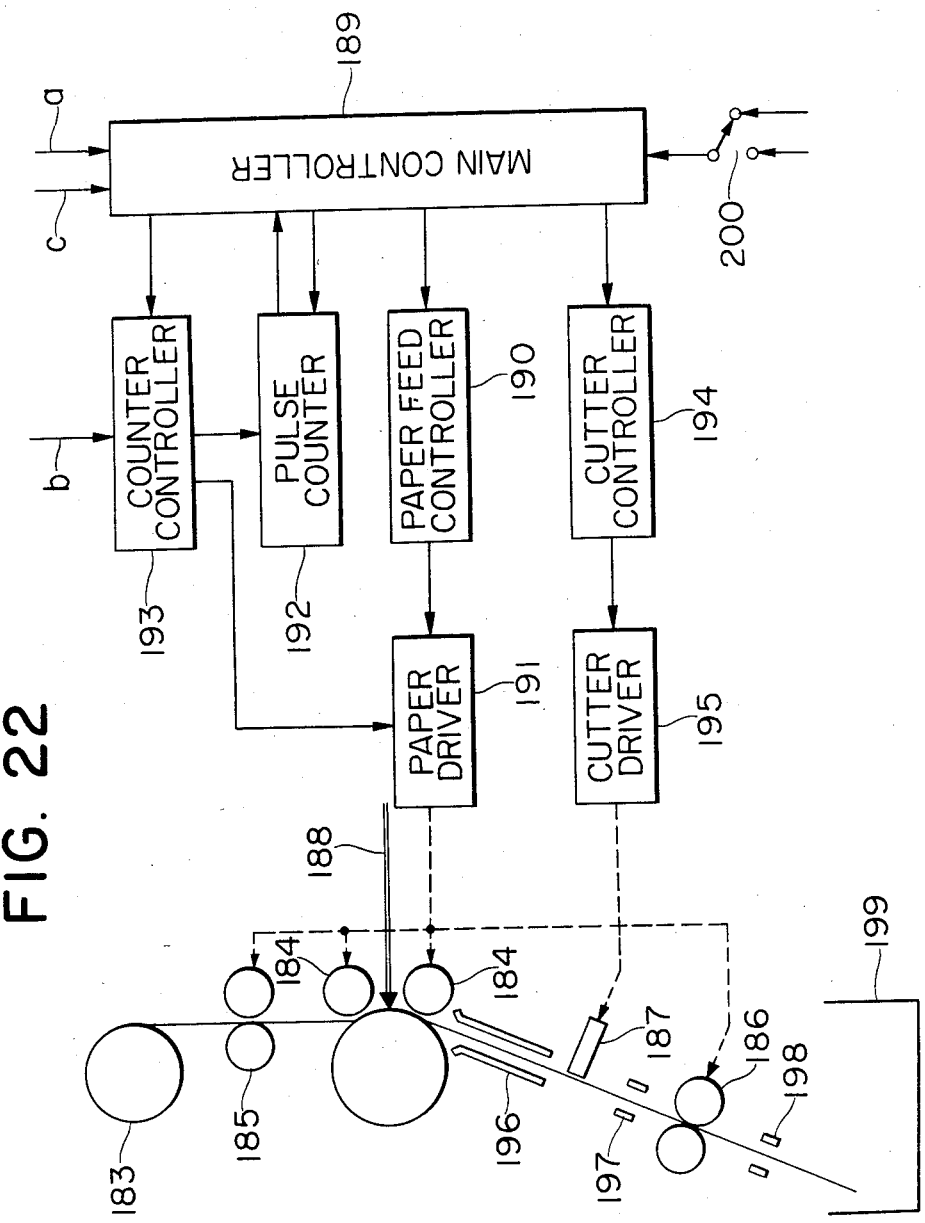
FIG. 22 is a schematic diagram of a recording paper control unit as part of a recorder according to still another embodiment of the present invention.

FIG. 22 is a block diagram of a recording paper control unit. Reference numeral 183 denotes a photosensitive material; 184, paper feed rollers; 185, paper rewind rollers; 186, paper exhaust rollers; 187, a cutter; 188, a recording laser beam; 189, a main controller; 190, a paper feed controller; 191, a paper driver; 192, a pulse counter; 193, a counter controller; 194, a cutter controller; 195, a cutter driver; 196, a recording paper guide; 197, a jam sensor; 198, a paper exhaust sensor; and 199, a paper exhaust magazine.

When the recording paper control unit is controlled by a pulse motor (stepping motor), since a mount of paper displacement per one input pulse is predetermined, a length of paper feed and a time of paper feed can be easily controlled by a number of the input pulse and the pulse frequency, respectively.

When a recording start signal a is supplied to the main controller 189, the controller 189 makes to be active to a pulse signal b for paper feed, and the pulse counter 192 counts the pulse signal b. The main controller 189 controls the paper driver 191 through the paper feed controller 190 according to the contents of the pulse counter 192.

In this case, only the paper feed rollers 184 are used. The paper rewind rollers 185 and the paper exhaust rollers 186 are not used.

As a result, the recording paper 183 is subscanned with a laser beam 188 to record binary image signal on the recording paper 183. The continuous recording length must be determined in accordance with the size of the exhaust magazine 199 and the size of the original. If the maximum recording length is preset to be 600 mm, continuous recording is performed over this length without cutting.

A selection switch 200 is arranged at the input terminal of the main controller 189 to enable or disable the automatic cutting mode, so that the operator can arbitrarily determine whether or not the recording paper is cut at a length of 600 mm. When the selection switch 200 is set to be OFF, the count of the pulse counter 192 is set to be 0 corresponding to the length of 600 mm, and the cutting operation is forcibly started (to be called "compulsory" cutting).

However, when the selection switch 200 is set to be ON, the cutting operation is started at the end of single scanning/recording. In the case, electronic halftone-dot generator can process a plurality of originals by a single scanning. When the automatic cutting mode is set to be ON, the cutting operation is started immediately after a single scanning. In this case, when a recording end signal c is entered at the end of each original during a single scanning, the main controller 189 disables paper driver 191 and the pulse counter 192, respectively, through paper feed controller 190 and the counter controller 193. However, the count of the pulse counter 192 is kept unchanged and is decremented at the start of recording of the next original. The pulse counter 192 continues monitoring of the scanning until its end. When the cutting operation is started, the pulse counter 192 is cleared.

In order to feed the recording paper 183 to the cutting position after recording, the main controller 189 controls the pulse counter 192 through the counter controller 193 such that the pulse counter 192 counts the pulses corresponding to the length between the recording position and the cutting position.

In this condition, when the jam sensor 197 generates a signal of logic level "1", the recording paper 183 properly passes by the jam sensor 197. However, when the recording paper 183 is clogged near the jam sensor 197, the jam sensor 197 generates a signal of logic level "0" to signal to the operator.

When the end of the recorded portion of the recording paper 183 has properly reached the cutting position, a cut timing signal is supplied to the cutter controller 194 and the cutter driver 195, thereby operating the cutter 187 to cut the recording paper 183.

When the cutting operation is completed, the paper feed controller controls the paper driver 191 to drive the paper rewind rollers 185, so that a recording paper portion corresponding to the nonexposed portion is counted by the pulse counter 192 and is rewound by the paper rewind rollers 185. In this manner, the paper portion is rewound to the recording position while the immediately preceding paper on which an image is recorded is exhausted to the exhaust magazine by the exhaust roller 186. In this case, the jam sensor 197 and the exhaust sensor 198 detect whether or not the recording paper 183 is properly exhausted into the exhaust magazine 199.

In this condition, the jam sensor 197 is to be set at logic level "0" since the recording paper 183 is supposed to pass thereby. On the other hand, the exhaust sensor 198 is set at logic level "1" since the recording 183 gradually passes thereby. The exhaust sensor 198 then goes to logic level "0" when the recording paper 183 has passed thereby.

When the jam sensor 197 and the exhaust sensor 198 are arranged through the cutter 187 and the exhaust roller 186, the recording paper 183 can be fed by a proper mount. Furthermore, rewinding and exhausting can be simultaneously controlled, thereby shortening the cutting time and preventing waste of the recording paper, and hence hastening the next scanning/recording.

Figure 23:
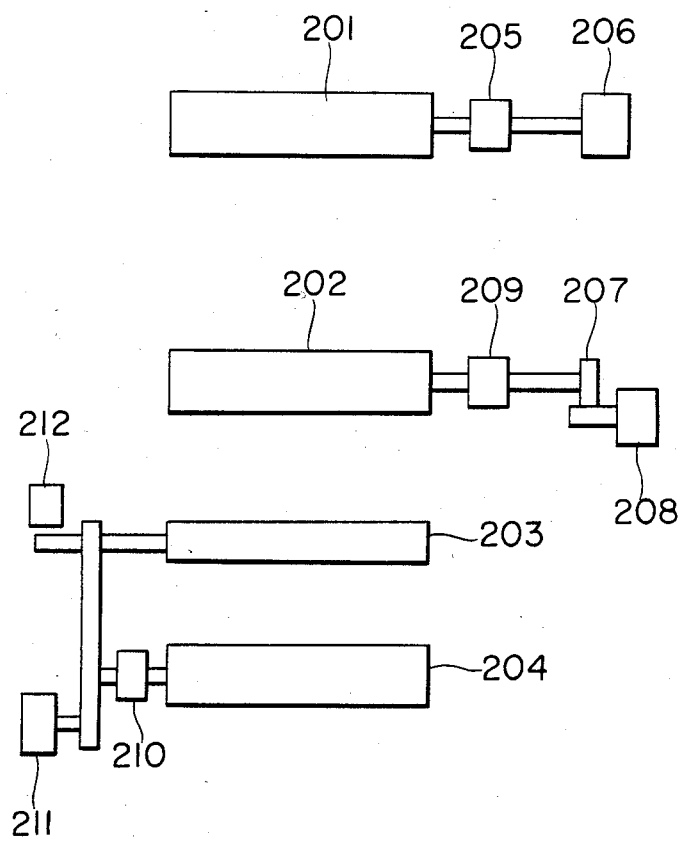
FIG. 23 is a representation showing a drive mechanism of the control unit shown in FIG. 22.

FIG. 23 shows a drive mechanism of the recording paper, as shown in FIG. 22, and FIG. 24 is a timing chart of signals with respect to the drive mechanism.

Referring to FIG. 23, reference numeral 201 denotes a paper rewind roller; 202, a paper feed roller; 203, a cutter; 204, a paper exhaust roller; 205, a paper rewind roller clutch; 206, a paper rewind motor; 207, a converter gear; 208, a paper feed pulse motor; 209, a feed roller clutch; 210, a paper exhaust roller clutch; 211, a cutter motor; and 212, a magnet plunger.

Referring to FIG. 24, a signal A is a power ON signal of the pulse motor 208; a signal B is a paper feed roller clutch signal; a signal C is a forward drive signal of the pulse motor 208 in FIG. 23; a signal D is a reverse drive signal of the pulse motor 206 in FIG. 23; a signal E is a pulse motor drive pulse signal; a signal F is an ON signal of the cutter motor 211; a signal G is an ON signal of the cutter 203; a signal H is a paper clutch signal for the exhaust roller; and a signal I is a paper rewind roller clutch signal.

The control of the recording paper drive operation will be described in detail with reference to FIGS. 23 and 24.

In the normal recording mode, the feed roller clutch 209 is operated to drive only the paper feed roller 202 by the pulse motor 208, thereby performing paper feeding. In this case, the paper rewind roller clutch 205 and the paper exhaust roller clutch 210 are disconnected, so that the paper rewind roller 201 and the paper exhaust roller 204 rotate freely with the feed of the recording paper. When recording is completed and cutting is started, the recording paper is fed to the cutting position.

The timing chart of the signals is illustrated in FIG. 24. The recording paper is driven by the pulse motor 208 during a time interval $T_1$ in response to the pulse motor power ON signal A, the paper feed roller clutch signal B, the pulse motor forward drive signal C and the drive pulse signal E. Thereafter, the cutter motor 211 is started in response to the signal G. When the recording paper 183 has reached the cutting position, the cutter 203 is rotated by one revolution during the time interval $T_2$ by the magnetic plunger 212 shown in FIG. 23, so as to cut the recording paper 183. After cutting is completed, the paper feed roller clutch 209 shown in FIG. 23 is disconnected from the paper feed roller 202, and the paper rewind roller clutch 205 and the paper exhaust roller clutch 210 are connected to the corresponding rollers. In this case, the motor 206 rewinds the recording paper 183, and at the same time, the cutter motor 211 drives the exhaust roller 204 during a time interval $T_3$. More particularly, during the time interval $T_3$, the recording paper 183 is rewound from the cutting position to the recording position in response to the signal D indicating the reverse rotation of the motor 206, the drive pulse signal E, and the paper rewind roller clutch signal H.

Meanwhile, the clutch signal I for the exhaust roller is set at logic level "1" in response to the cutter motor ON signal F, so that the desired recording paper 183 is exhausted into the exhaust magazine 199.

According to the recording control unit as a part of the recorder 17c, as has been apparent from the above description, the drive unit and sensors are disposed so as to cause the recording control unit to simultaneously perform rewinding and exhausting of the recording paper. As a result, after recording process the recording paper is properly fed to the position where the paper must be cut and after cutting the recording paper is properly rewound to the position where the recording paper will be recorded at next scanning, so that the recording paper can be economically used, and the operating time can be greatly shortened.

What is claimed is:

1. An image processor comprising:
   image reading means for photoelectrically scanning image data of an original to obtain an input analog image signal;
   sampling means for A/D-converting the input analog image signal to sample the image data, thereby obtaining a sampled digital image signal;
   correcting means for linearly correcting the sampled digital image signal with respect to an image density between the original and a recording image in accordance with the image data of the original, wherein said correcting means performs a conversion to obtain an output $Q_i'$ given by $$Q_i' = \frac{Q_{iM}}{1 - 10^{-D_{OM}}} \cdot \left[1 - 10^{\frac{D_{OM}}{SH-HL} \cdot \{log(10-HL - \frac{10-HL-10SH}{Q_{iM}}Q_i) + HL\}}\right]$$

$$Q_i/Q_{iM} = (1 - 10^{-D_i})/(1 - 10^{-D_{iM}})$$

where
$Q_i$ is the sampled digital image signal
$Q_{iM}$ is the value of the sampled digital image signal when $D_i = D_{iM}$
HL is a predetermined black density of the original
$D_{OM}$ is a recording density of black when a recording density of white is give as 0
$D_i$ is a density of a pixel of the original $D_{IM}$ is a density of the pixel of the original having the highest black density value; and processing image data generating means for generating a binary processing image signal in accordance with the output $Q_i'$ from said correcting means.

2. A processor according to claim 1, wherein said processing image data generating means comprises:
- a memory for storing threshold data to obtain a binary dot recording signal from the sampled digital image signal;
- an address counter for writing the threshold data at a predetermined location of said memory;
- a register for storing data indicating a size of a window in a main scan direction and a subscan direction of the threshold data;
- a selector for switching between a write address and a read address of said memory;
- a pixel clock pulse counter for determining upper/lower bits of the read address of said memory;
- a first comparator for comparing a content of said pixel clock pulse counter and the data indicating the size of the window in the main scan direction of the threshold data;
- a main scan synchronous pulse counter for determining upper/lower bits of the read address of said memory;
- a second comparator for comparing a content of said main scan synchronous pulse counter and the data indicating the size of the window in the subscan direction of the threshold data; and
- a third comparator for comparing the threshold data read out from said memory and the sampled digital image data.

3. A processor according to claim 1, wherein a recording unit of said image reading means and said processing image data generating means comprises:
- a single light source;
- splitting means for splitting a light beam emitted from said light source into a first light beam for image scanner/scanning and a second light beam for image recording;
- a rotating polygon mirror for reflecting the first and second light beams at different surfaces thereof;
- detecting means for detecting a surface-index of said rotating polygon mirror;
- a first processing means for processing a read image signal obtained by emitted the first light beam onto the original;
- a second processing means for recording an output image on a recording paper using the second light beam; and
- controlling means for synchronizing the processing of said first processing means with the processing of said second processing means in accordance with a detection result from said detecting means.

4. A processor according to claim 1, wherein a recording unit of said processing image data generating means comprises:
- first controlling means for separately controlling paper feed operation, paper rewind operation and paper exhausting operation of a recording paper drive section;
- second controlling means for determining a length of recording paper and for generating control signals to control the paper feed, rewind and exhausting operations in accordance with a count operation thereof; and
- third controlling means for controlling cutting of the recording paper.

5. A processor according to claim 1, wherein said image reading means comprises:
- read start position designating means for designating a read start position of the original;
- original area designating means for dividing a region of the original into a plurality of original scanning areas in accordance with a length along the subscan direction of the original;
- control item designating means for designating at least one of an image scanning control item, an image signal processing control item and an output control item for each of the plurality of original scanning areas; and
- image signal processing means for processing the corrected digital image signal in accordance with the control item designated by said control item designating means.

6. A processor according to claim 5, wherein
said image reading means photoelectrically scans the original mounted on a rotating drum; and
said original area designating means comprises: position indicator knobs slidably mounted on a linear support disposed along the subscan direction so as to respectively designate the plurality of original scanning areas; a read-start position indicator for indicating a read-start position of said rotating drum; and an object detector mounted on a subscan carriage at a reading position of the original so as to detect said position indicator knobs and said read-start position indicator.

7. A processor according to claim 5, wherein
said image reading means scans the original mounted on a flat original carriage, and
said original area designating means comprises: position indicator knobs slidably mounted on a linear support disposed along the subscan direction of said flat-bed type original carriage so as to respectively designate the plurality of original scanning areas; a read-start position indicator for indicating a read-start position of said flat-bed type original carriage; and an object detector mounted on a subscan carriage at a reading position of the original so as to detect said position indicator knobs and said read-start position indicator.

8. A processor according to claim 5, wherein said control item designating means comprises:
- an item preset unit for presetting control item data for each of a plurality of originals;
- an operation unit for reading out the control item data from said item preset unit to perform predetermined operation;
- a memory for storing control parameters in memory areas respectively corresponding to the plurality of originals after the predetermined operation is performed by said operation unit;
- a counter for counting a read start signal or an original end signal from said object detector; and
- a distributor for distributing the control parameters to predetermined destinations in accordance with a count result of said counter.

9. An image processor comprising:
- image reading means for photoelectrically scanning image data of an original to obtain an input analog image signal;

sampling means for A/D-converting the input analog image signal to sample the image data, thereby obtaining a sampled digital image signal;

correcting means for performing edge enhancement correction of the sampled digital image signal in accordance with the image data of the original; and processing image data generating means for generating a binary processing image signal in accordance with an output from said correcting means, said correcting means comprising:

memory means having a plurality of line memories which are given individual line numbers and which stores in a predetermined order of the line number the sampled digital image signals supplied from said sampling means;

readout means for reading out the sampled digital image signals from said line memory in the predetermined order of the line number;

signal output means for reading out the sampled digital image signals in synchronism with said readout means;

delaying means for delaying a plurality of multi-level digital image signals by a predetermined number of clock periods obtained by said readout means and said signal output means;

parameter preset means for presetting a predetermined edge emphasis parameter;

calculating means for performing edge emphasis operation in accordance with the plurality of sampled digital image signals delayed by said delaying means and the edge emphasis parameter preset by said parameter preset means; and calculation result output means for producing a result of calculation performed by said calculating means.

10. A processor according to claim 9, wherein said line memory has line numbers 1 to 17;

said memory means stores the sampled digital image signals in an order of the line numbers 1, 2, 3, 4, 5, 6, 7, 8, 9, 10, 11, 12, 13, 14, 15, 16 and 17;

said readout means has first and second readout means, said first readout means being operated to read out the sampled digital image signals in an order of the line numbers 2, 3, 4, 5, 6, 7, 8, 9, 10, 11, 12, 13, 14, 15, 16, 17 and 1, and said second readout means being operated to read out the sampled digital image signals in an order of the line numbers 10, 11, 12, 13, 14, 15, 16, 17, 1, 2, 3, 4, 5, 6, 7, 8, and 9;

said delaying means delays three kinds of multi-level image signals obtained by said reading means and said signal output means by one, nine and 17 periods of a data clock synchronized with the sampled digital image signals, respectively; and said operating means performs an operation $D5 + K \times \{D5 - \frac{1}{8} \times (D1 + D2 + D3 + D4 + D5 + D6 + D7 + D8 + D9)\}$ where D1, D2 and D3 are values of the image signals delayed by said first readout means and said delaying means, D4, D5 and D6 are values of image signals delayed by said second readout means and said delaying means, D7, D8 and D9 are values of image signals delayed by said signal output means and said delaying means, and K is a edge emphasis parameter.

11. A processor according to claim 9, wherein said correcting means comprises:

memory means, having a plurality of line memories which are given individual line numbers, for storing the sampled digital image signals in a predetermined order of the line number;

readout means for reading out the sampled digital image signals from said line memory in the predetermined order of the line number;

delaying means for delaying the sampled digital image signals from said readout means by a predetermined number of clock periods;

parameter preset means for presetting a predetermined edge emphasis parameter;

calculating means for performing edge emphasis operation in accordance with the sampled digital image signals delayed by said delaying means and the edge emphasis parameter preset by said parameter preset means; and result output means for generating a calculation result from said calculating means.

12. A processor according to claim 9, wherein said processing image data generating means comprises:

a memory for storing threshold data to obtain a binary dot recording signal from the sampled digital image signal;

an address counter for writing the threshold data at a predetermined location of said memory;

a register for storing data indicating a size of a window in a main scan direction and a subscan direction of the threshold data;

a selector for switching between a write address and a read address of said memory;

a pixel clock pulse counter for determining upper/lower bits of the read address of said memory;

a first comparator for comparing a content of said pixel clock pulse counter and the data indicating the size of the window in the main scan direction of the threshold data;

a main scan synchronous pulse counter for determining upper/lower bits of the read address of said memory;

a second comparator for comparing a content of said main scan synchronous pulse counter and the data indicating the size of the window in the subscan direction of the threshold data; and a third comparator for comparing the threshold data read out from said memory and the sampled digital image data.

13. A processor according to claim 9, wherein a recording unit of said image reading means and said processing image data generating means comprises:

a single light source;

splitting means for splitting a light beam emitted from said light source into a first light beam for image scanner/scanning and a second light beam for image recording;

a rotating polygon mirror for reflecting the first and second light beams at different surfaces thereof;

detecting means for detecting a surface-index state of said rotating polygon mirror;

a first processing means for processing a read image signal obtained by radiating the first light beam onto the original;

a second processing means for recording an output image on a recording paper using the second light beam; and controlling means for synchronizing the processing of said first processing means with the processing of said second processing means in accordance with a detection result from said detecting means.

14. A processor according to claim 9, wherein a recording unit of said processing image data generating means comprises:
   first controlling means for separately controlling paper feed operation, paper rewind operation and paper exhausting operation of a recording paper drive section;
   second controlling means for determining a length of recording paper and for generating control signals to control the paper feed, rewind and exhausting operations in accordance with a count operation thereof; and
   third controlling means for controlling cutting of the recording paper.

15. A processor according to claim 9, wherein said image reading means comprises:
   read-start position designating means for designating a read-start position of the original;
   original area designating means for dividing a region of the original into a plurality of original scanning areas in accordance with a length along the subscan direction of the original;
   control item designating means for designating at least one of an image scanning control item, an image signal processing control item and an output control item for each of the plurality of original scanning areas; and
   image signal processing means for processing the corrected digital image signal in accordance with the control item designated by said control item designating means.

16. A processor according to claim 15, wherein
   said image reading means photoelectrically scans the original mounted on a rotating drum; and
   said original area designating means comprises: position indicator knobs slidably mounted on a linear support disposed along the subscan direction so as to respectively designate the plurality of original scanning areas; a read-start position indicator for indicating a read-start position of said rotating drum; and an object detector mounted on a subscan carriage at a reading position of the original so as to detect said position indicator knobs and said read-start position indicator.

17. A processor according to claim 15, wherein
   said image reading means scans the original mounted on a flat bed-type original carriage, and
   said original area designating means comprises: position indicator knobs slidably mounted on a linear support disposed along the subscan direction of said flat-bed type original carriage so as to respectively designate the plurality of original scanning areas; a read-start position indicator for indicating a read-start position of said flat-bed type original carriage; and an object detector mounted on a subscan carriage at a reading position of the original so as to detect said position indicator knobs and said read start-position indicator.

18. A processor according to claim 15, wherein said control item designating means comprises:
   an item preset unit for presetting control item data for each of a plurality of originals;
   an operation unit for reading out the control item data from said item preset unit to perform predetermined operation;
   a memory for storing control parameters in memory areas respectively corresponding to the plurality of originals after the predetermined operation is performed by said operation unit;
   a counter for counting a read start signal or an original end signal from said object detector; and
   a distributor for distributing the control parameters to predetermined destinations in accordance with a count result of said counter.

* * * * *